United States Patent
Baek et al.

(10) Patent No.: US 12,232,220 B2
(45) Date of Patent: Feb. 18, 2025

(54) METHOD AND APPARATUS FOR TRANSMITTING PACKET IN WIRELESS COMMUNICATION SYSTEM

(71) Applicant: Samsung Electronics Co., Ltd., Suwon-si (KR)

(72) Inventors: Sangkyu Baek, Suwon-si (KR); Hyunjeong Kang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 123 days.

(21) Appl. No.: 18/297,395

(22) Filed: Apr. 7, 2023

(65) Prior Publication Data

US 2023/0247722 A1      Aug. 3, 2023

Related U.S. Application Data

(63) Continuation of application No. 16/571,821, filed on Sep. 16, 2019, now abandoned.

(30) Foreign Application Priority Data

Sep. 14, 2018    (KR) .................. 10-2018-0110469

(51) Int. Cl.
*H04W 80/08*    (2009.01)
*H04L 1/1607*    (2023.01)
(Continued)

(52) U.S. Cl.
CPC ........... *H04W 80/08* (2013.01); *H04L 1/1642* (2013.01); *H04W 4/40* (2018.02); *H04W 28/06* (2013.01); *H04W 80/02* (2013.01)

(58) Field of Classification Search
None
See application file for complete search history.

(56) References Cited

U.S. PATENT DOCUMENTS 10,448,386 B2   10/2019   Hong et al.
11,202,279 B2   12/2021   Km et al.
(Continued)

FOREIGN PATENT DOCUMENTS

CN    101686494 A    3/2010
CN    106233697 A   12/2016
(Continued)

OTHER PUBLICATIONS

LG Electronics Inc., Handling of the first received PDCP PDU located outside of the reordering window, 3GPP TSG-RAN2 Meeting #103, R2-1812809, Gothenburg, Sweden, Aug. 10, 2018, See section 2.

(Continued)

*Primary Examiner* — Rebecca E Song
(74) *Attorney, Agent, or Firm* — Jefferson IP Law, LLP

(57) ABSTRACT

A method, performed by a terminal, of transmitting and receiving a signal in a wireless communication system is provided. The method includes setting a value of a Next_Packet Data Convergence Protocol (PDCP)_RX_sequence number (SN) variable as an initial value, the Next_PDCP_RX_SN variable indicating a predicted SN of PDCP data to be received, receiving first PDCP data from a transmission entity after setting the initial value, and setting the value of the Next_PDCP_RX_SN variable as a value obtained by adding a first setting value to a value of the SN of the PDCP data.

8 Claims, 27 Drawing Sheets

(51) Int. Cl.
*H04W 4/40* (2018.01)
*H04W 28/06* (2009.01)
*H04W 80/02* (2009.01)

(56) References Cited

U.S. PATENT DOCUMENTS

| | | | |
|---|---|---|---|
| 2015/0305012 A1 | 10/2015 | Yi et al. | |
| 2016/0183221 A1* | 6/2016 | Yi | H04L 1/1851 370/329 |
| 2016/0315868 A1* | 10/2016 | Zhang | H04L 47/624 |
| 2017/0111945 A1 | 4/2017 | Yi et al. | |
| 2018/0198566 A1 | 7/2018 | Yi et al. | |
| 2019/0044880 A1* | 2/2019 | Yi | H04L 47/624 |
| 2019/0297610 A1 | 9/2019 | Yi et al. | |
| 2019/0350022 A1 | 11/2019 | Yi et al. | |
| 2020/0084659 A1* | 3/2020 | Pan | H04W 28/06 |

FOREIGN PATENT DOCUMENTS

| | | |
|---|---|---|
| CN | 107079005 A | 8/2017 |
| EP | 3 621 252 A1 | 3/2020 |
| KR | 10-2017-0095918 A | 8/2017 |
| KR | 10-2017-0113768 A | 10/2017 |
| KR | 10-2018-0081446 A1 | 7/2018 |
| KR | 10-2018-0084605 A1 | 7/2018 |
| WO | 2017/152936 A | 9/2017 |
| WO | 2018/127842 A1 | 7/2018 |
| WO | 2018/131975 A1 | 7/2018 |

OTHER PUBLICATIONS

OPPO, Left issues on PDCP operation for duplication, 3GPP TSG-RAN WG2 Meeting #103, R2-1812937, Gothenburg, Sweden, Aug. 14, 2018, See p. 4.
International Search Report dated Dec. 24, 2019, issued in the International Patent Application No. PCT/KR2019/011916.
Extended European Search Report dated Sep. 1, 2021, issued in a counterpart European Application No. 19860848.1-1213 / 3837813.
Ericsson: Introduction of Ultra Reliable Low Latency Communication for LTE; 3GPP TSG-RAN2 Meeting #102; R2-1809210, May 25, 2018, Busan, South Korea.
European Office Action dated Aug. 24, 2022, issued in a counterpart European Application No. 19860848.1.
Indian Office Action dated Nov. 23, 2022, issued in a counterpart Indian Application No. 202137009956.
Korean Office Action dated May 22, 2023, issued in Korean Patent Application No. 10-2018-0110469.
European Notice of Allowance dated Aug. 1, 2023, issued in European Patent Application No. 19860848.1.
Chinese Notice of Allowance dated May 17, 2024, issued in Chinese Patent Application No. 201980060300.X.
LG Electronics Inc., Introduction of PDCP duplication for LTE, R2-1808537, 3GPP TSG-RAN2 Meeting #102, May 11, 2018.
Chinese Office Action dated Oct. 21, 2023, issued in Chinese Patent Application No. 201980060300.X.

* cited by examiner

METHOD AND APPARATUS FOR TRANSMITTING PACKET IN WIRELESS COMMUNICATION SYSTEM

CROSS-REFERENCE TO RELATED APPLICATION(S)

This application is a continuation application of prior application Ser. No. 16/571,821, filed on Sep. 16, 2019, which is based on and claims priority under 35 U.S.C § 119(a) of a Korean patent application number 10-2018-0110469, filed on Sep. 14, 2018, in the Korean Intellectual Property Office, the disclosure of which is incorporated by reference herein in its entirety.

BACKGROUND

1. Field

The disclosure relates to a wireless communication system, and in particular, to a method and an apparatus for providing a service in a wireless communication system. More particularly, the disclosure relates to a method and an apparatus for transmitting a packet in a wireless communication system.

2. Description of Related Art

To meet increasing demand with respect to an increase in wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. 5G communication system specified in the 3rd Generation Partnership Project (3GPP) is called a New Radio (NR) system. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies, such as beamforming, massive multiple-input and multiple-output (massive MIMO), full-dimension MIMO (FD-MIMO), array antennas, analog beamforming, and large-scale antennas are being studied, and are applied to the NR system. To improve system networks for 5G communication systems, various technologies, such as evolved small cells, advanced small cells, cloud radio access networks (Cloud-RAN), ultra-dense networks, device-to-device communication (D2D), wireless backhaul, moving networks, cooperative communication, coordinated multi-points (CoMP), interference cancellation, or the like have been developed. In addition, for 5G communication systems, advanced coding modulation (ACM) technologies, such as hybrid frequency-shift keying (FSK) and quadrature amplitude modulation (QAM) (FQAM) and sliding window superposition coding (SWSC), and advanced access technologies, such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements, such as objects exchange information with each other to process the information. Internet of everything (IoE) technology has emerged, in which the IoT technology is combined with, for example, technology for processing big data through connection with a cloud server. To implement the IoT, various technological elements, such as sensing technology, wired/wireless communication and network infrastructures, service interface technology, and security technology are required. In recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields, such as smart homes, smart buildings, smart cities, smart cars or connected cars, smart grids, health care, smart home appliances, advanced medical services, or the like.

Various attempts are being made to apply 5G communication systems to the IoT network. For example, technologies related to sensor networks, M2M communication, and MTC are being implemented by using 5G communication technology including beamforming, Multiple-In Multiple-Out (MIMO), and array antennas. Application of cloud radio access network (Cloud-RAN) as the above-described big data processing technology may be an example of convergence of 5G communication technology and IoT technology.

Because various services are enabled to be provided due to the aforementioned technical features and the development of wireless communication systems, methods for effectively providing these services are required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for providing a service in a wireless communication system.

Additional aspects will be set forth in part in the description which follows and, in part, will be apparent from the description, or may be learned by practice of the presented embodiments.

In accordance with an aspect of the disclosure, a method, performed by a terminal, of transmitting and receiving a signal in a wireless communication system is provided. The method includes setting a value of a Next_Packet Data Convergence Protocol (PDCP)_RX_sequence number (SN) variable as an initial value, the Next_PDCP_RX_SN variable indicating a predicted SN of PDCP data to be received, receiving first PDCP data from a transmission entity after setting the initial value, and setting the value of the Next_PDCP_RX_SN variable as a value obtained by adding a first setting value to a value of the SN of the PDCP data.

In accordance with another aspect of the disclosure, a method, performed by a PDCP layer, of transmitting a packet in a wireless communication system is provided. The method includes determining a value of a Quality of Service (QoS) requirement of the packet, comparing the value of the QoS requirement of the packet with a threshold value, determining whether duplicate packet transmission is required, based on a result of the comparing of the value of the QoS requirement of the packet with the threshold value, and selectively performing the duplicate packet transmission, based on a result of determining whether the duplicate packet transmission is required.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
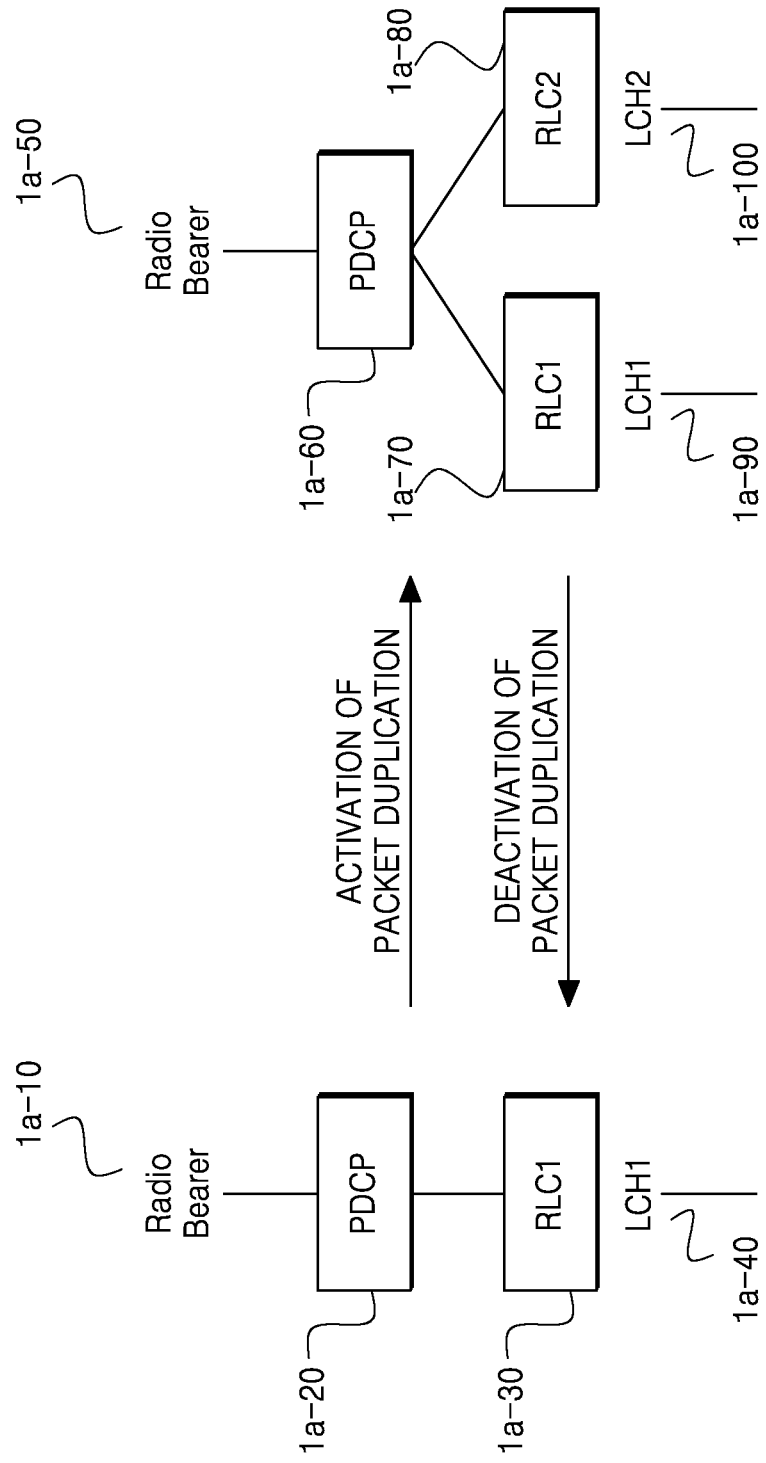
FIG. 1 is a diagram illustrating a change in a radio bearer configuration according to whether duplicate packet transmission is to be performed according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

For the same reason, some elements in the drawings are exaggerated, omitted, or schematically illustrated. In addition, the size of each element does not entirely reflect the actual size. In the drawings, the same or corresponding elements are denoted by the same reference numerals.

The terms and words used in the following description and claims are not limited to the bibliographical meanings, but, are merely used by the inventor to enable a clear and consistent understanding of the disclosure. Accordingly, it should be apparent to those skill in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "~ unit", as used in the embodiment of the disclosure refers to a software or hardware component, such as field-programmable gate array (FPGA) or application-specific integrated circuit (ASIC), which performs certain tasks. However, the term "~ unit" does not mean to be limited to software or hardware. A unit may be configured to be in an addressable storage medium or configured to operate one or more processors. Thus, a unit may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and units may be combined into fewer components and units or further separated into additional components and units. Further, the components and units may be implemented to operate one or more central processing units (CPUs) in a device or a secure multimedia card. In addition, a unit may include one or more processors in an embodiment of the disclosure.

Throughout the disclosure, the expression "at least one of a, b or c" indicates only a, only b, only c, both a and b, both a and c, both b and c, all of a, b, and c, or variations thereof.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

Hereinafter, for convenience of explanation, the disclosure uses terms and names defined in the $3^{rd}$ generation partnership project long term evolution (3GPP LTE) standards. However, the disclosure is not limited to the terms and names, and may also be applied to systems following other standards. In an embodiment of the disclosure, an evolved node B (eNB) may be interchangeably used with a next-generation node B (gNB) for convenience of explanation. For example, a base station (BS) described by an eNB may represent a gNB. In an embodiment of the disclosure, the term "terminals" may refer to not only mobile phones, narrowband Internet of Things (NB-IoT) devices, and sensors but also other wireless communication devices. Hereinafter, a layer may also referred to as an entity.

FIG. 1 is a diagram illustrating a change in a radio bearer configuration according to whether duplicate packet transmission is to be performed according to an embodiment of the disclosure.

Referring to FIG. 1, a radio bearer 1a-10 that does not perform duplicate packet transmission may be connected to a Packet Data Convergence Protocol (PDCP) layer 1a-20 and a Radio Link Control (RLC) entity 1a-30 (also referred to as the RLC1 1a-30). In this regard, each RLC entity may correspond to a logical channel, and the RLC1 1a-30 may correspond to a logical channel 1 (LCH1) 1a-40. When a terminal does not perform the duplicate packet transmission, a packet that arrives at the radio bearer 1a-10 may not be packet-duplicated by the PDCP layer 1a-20, a PDCP header may be added thereto, and then the packet may be transferred to the RLC entity 1a-30. In addition, an RLC header may be added to the packet by the RLC entity 1a-30, and the packet may be transmitted through the RLC2 1a-40. In an embodiment of the disclosure, an RLC entity of a receiver may identify an RLC entity of each packet by using a logical channel identifier (LCID) included in each Medium Access Control (MAC) subheader, such that the packet may be transferred to the RLC entity 1a-30. After the RLC header is removed, the packet may be transferred to the PDCP layer 1a-20 and thus the PDCP header may be removed.

In an embodiment of the disclosure, duplicate packet transmission may be activated due to various reasons including settings of a base station, self-determination by the terminal, or the like. In this regard, a radio bearer 1a-50 may be connected to a PDCP layer 1a-60 and at least two RLC entities 1a-70 and 1a-80 (also referred to as the RLC1 1a-70 and the RLC2 1a-80). In an embodiment of FIG. 1, two RLC entities are shown as an example, but the number of RLC entities in the disclosure is not limited thereto and may extend to two or more RLC entities. Each RLC entity may correspond to a logical channel. In an embodiment of FIG. 1, the RLC1 1a-70 and the RLC2 1a-80 may correspond to a RLC2 1a-90 and a LCH2 1a-100 (also referred to as the LCH 1a-90 and the LCH 1a-100), respectively. When the terminal performs the duplicate packet transmission, packet duplication may be performed on a packet by the PDCP layer 1*a*-60, the packet arriving at the radio bearer 1*a*-50, and a PDCP header may be added to each of the packets. Afterward, the respective packets may be transferred to the RLC entities 1*a*-70 and 1*a*-80. The RLC entities 1*a*-70 and 1*a*-80 may each add an RLC header to the respective packets, and may transmit the packets through the LCHs 1*a*-90 and 1*a*-100, respectively. An RLC entity of a receiver may identify an RLC entity of each packet by using an LCID included in each MAC subheader, such that the respective packets may be transferred to the RLC entities 1*a*-70 and 1*a*-80. After the RLC header of each of the packets is removed, the packets may be transferred to the PDCP layer 1*a*-60 and thus the PDCP header may be removed.

In an embodiment of the disclosure, because a same packet may be received from each of RLC entities, a PDCP layer may perform a duplication detection function and thus may prevent the same packet from being transferred to an upper layer several times. In addition, because a time when a packet is transferred from each RLC entity is not regular, the PDCP layer may perform a reordering function so as to allow packets to be transferred from a PDCP layer of the receiver to an upper layer according to an order, the packets being transmitted from a PDCP layer of a transmitter. For the duplication detection or the reordering function which is described above, it is required for the PDCP layer of the receiver to identify an order of packets, and thus, when duplicate packet transmission is performed, a sequence number (SN) of a PDCP layer may be included in a PDCP header.

Figure 2:
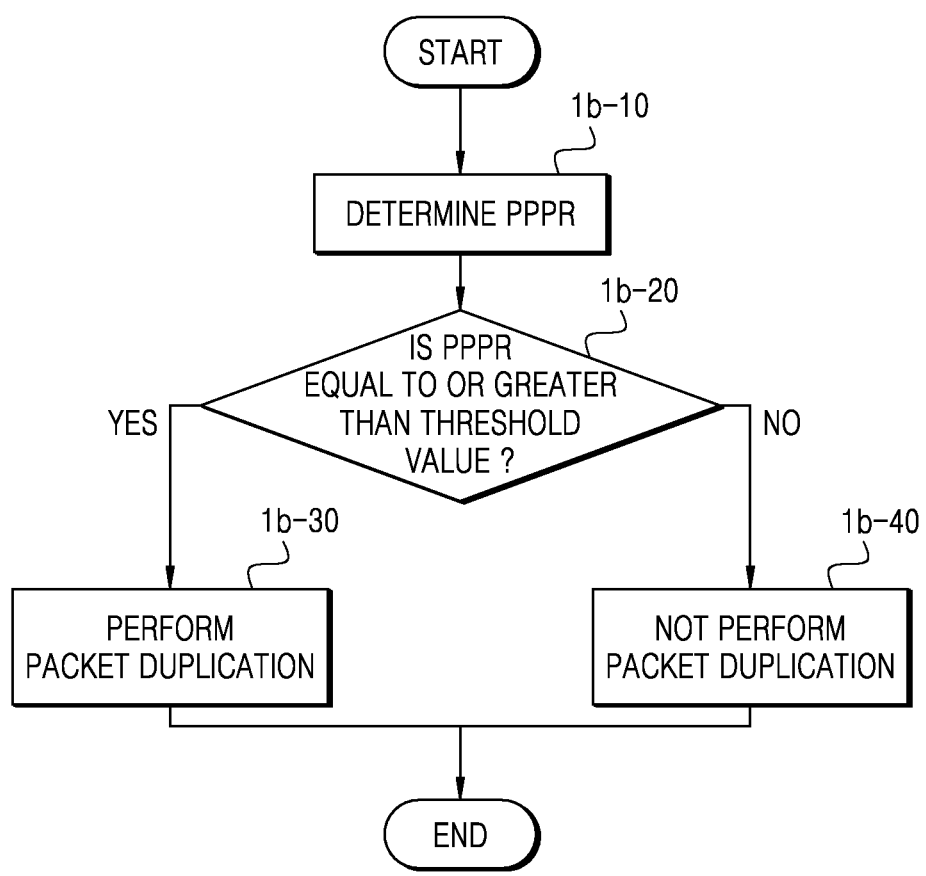
FIG. 2 is a flowchart illustrating a process of determining packet duplication in a Packet Data Convergence Protocol (PDCP) layer of a transmitter according to an embodiment of the disclosure.

FIG. 2 is a flowchart illustrating a process of determining packet duplication in a PDCP layer of a transmitter according to an embodiment of the disclosure.

Referring to FIG. 2, a packet that arrives at the PDCP layer of the transmitter may have a Quality of Service (QoS) requirement to be processed by the packet. The QoS requirement may include a function index, such as a reliability level, a packet error rate, a delay time, or the like, or may correspond to a representative value indicating the QoS requirement.

In an embodiment of FIG. 2, as an example, a method of determining whether to perform packet duplication, based on a ProSe Per-Packet Reliability (PPPR) used in vehicle-to-everything (V2X) communication, is illustrated. In the V2X communication, a PPPR value may represent a QoS requirement of a packet to be transmitted.

In operation 1*b*-10, when a packet arrives at the PDCP layer of the transmitter, the PDCP layer may determine a PPPR value of the packet.

In operation 1*b*-20, the PPPR value of the packet may be compared with a threshold value at which duplicate packet transmission is requested.

When the PPPR value of the packet is equal to or greater than the threshold value at which the duplicate packet transmission is requested, in operation 1*b*-30, the PDCP layer of the transmitter may determine that the duplicate packet transmission is requested. The PDCP layer of the transmitter may duplicate the packet and may transfer packets to at least two RLC entities for transmission.

When the PPPR value of the packet is less than the threshold value at which the duplicate packet transmission is performed, in operation 1*b*-40, the PDCP layer of the transmitter may determine that the duplicate packet transmission is not requested. The PDCP layer of the transmitter may not duplicate the packet and may transfer the packet to only one RLC entity.

Figure 3:
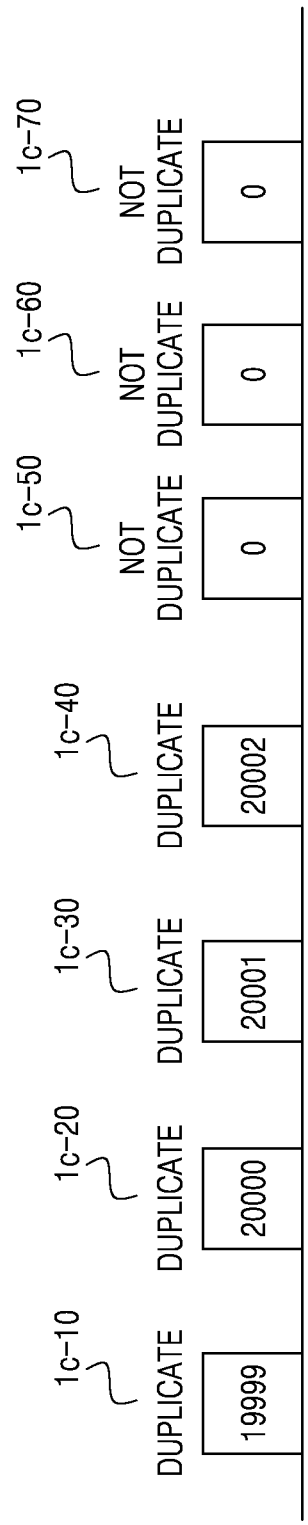
FIG. 3 is a diagram illustrating an operation process of a transmitter in which duplicate packet transmission is deactivated according to an embodiment of the disclosure.

FIG. 3 is a diagram illustrating an operation process of a transmitter in which duplicate packet transmission is deactivated according to an embodiment of the disclosure.

Referring to FIG. 3, after the duplicate packet transmission is activated, a duplication detection function or a reordering function of a receiver may be required. Because it is required for a PDCP layer of the receiver to identify an order of a packet, when the duplicate packet transmission is performed, a PDCP layer may allocate a SN to be included in a PDCP header.

When the duplicate packet transmission is deactivated or is not configured, the PDCP layer of the receiver may not use the duplication detection function and the reordering function. Therefore, the SN of the PDCP layer may not be necessarily allocated. However, because a format of a PDCP header is fixed, and a field corresponding to an SN exists in the PDCP header, when packet duplication is deactivated or is not configured, an SN of a corresponding packet may be set as 0 and then may be transmitted.

Referring to FIG. 3, an example is illustrated, in which the transmitter continuously performs duplicate packet transmission (1*c*-10, 1*c*-20, and 1*c*-30), and after transmission of a packet 1*c*-40 corresponding to an SN of 20002, the duplicate packet transmission is not required any more. For packets thereafter, the duplicate packet transmission is not performed, and thus the transmitter may transmit packets 1*c*-50, 1*c*-60, and 1*c*-70 by setting SNs as 0.

Figure 4:
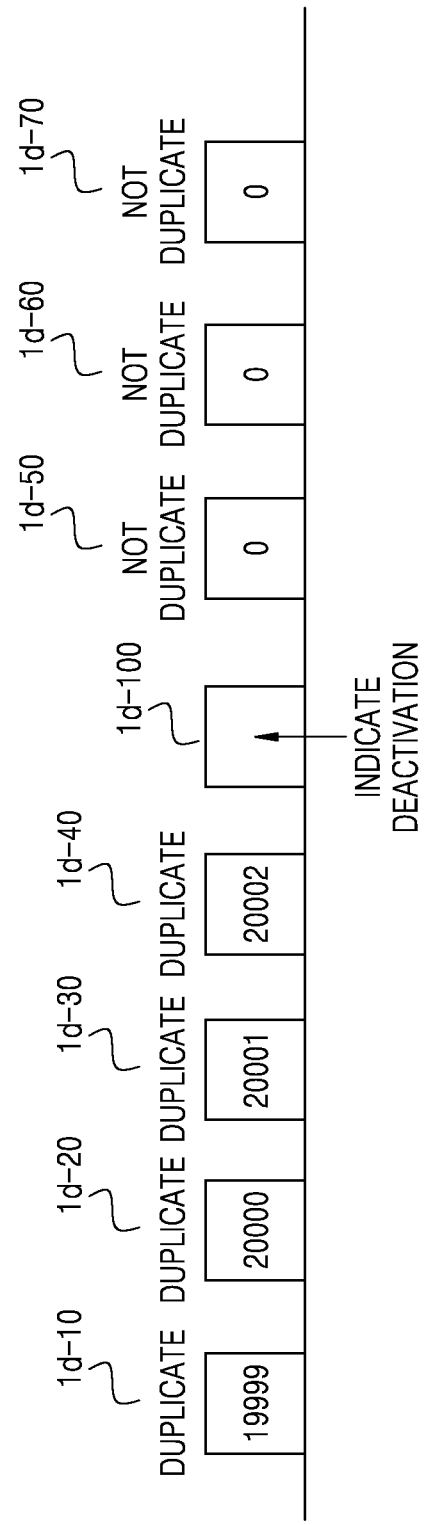
FIG. 4 is a diagram illustrating an operation process of a transmitter in which duplicate packet transmission is deactivated according to an embodiment of the disclosure.

FIG. 4 is a diagram illustrating an operation process of a transmitter in which duplicate packet transmission is deactivated according to an embodiment of the disclosure.

Referring to FIG. 4, after the duplicate packet transmission is activated, a duplication detection function or a reordering function of a receiver may be required. Because it is required for a PDCP layer of the receiver to identify an order of a packet, when the duplicate packet transmission is performed, a PDCP layer may allocate an SN to be included in a PDCP header.

When the duplicate packet transmission is deactivated or is not configured, the PDCP layer of the receiver may not use the duplication detection function and the reordering function. Therefore, the SN of the PDCP layer may not be necessarily allocated. However, because a format of a PDCP header is fixed, and a field corresponding to an SN exists in the PDCP header, when packet duplication is deactivated or is not configured, an SN of a corresponding packet may be set as 0 and then may be transmitted.

In an embodiment of the disclosure, in a gap between a time when the duplicate packet transmission is performed and a time when the duplicate packet transmission is not performed, the transmitter may transmit, to the receiver, a message 1*d*-100 indicating that packet duplication is not to be performed any more. When the receiver receives the message 1*d*-100, the receiver may not perform a receiver operation corresponding to the duplicate packet transmission.

Referring to FIG. 4, an example is illustrated, in which the transmitter continuously performs the duplicate packet transmission (1*d*-10, 1*d*-20, and 1*d*-30), and after transmission of a packet 1*d*-40 corresponding to an SN of 20002, the duplicate packet transmission is not required any more. After the transmitter transmits the message 1*d*-100 indicating deactivation, the transmitter does not perform the duplicate packet transmission on packets after the message 1*d*-100, and thus may transmit packets 1*d*-50, 1*d*-60, and 1*d*-70 by setting SNs as 0. In an embodiment of the disclosure, in a case where an SN is continuously set as a non-zero value even when the packet duplication is deactivated, the receiver may not perform a receiver operation for the duplicate packet transmission, according to the message 1d-100 indicating deactivation. In an embodiment of the disclosure, the receiver may perform an operation according to deactivation of the duplicate packet transmission.

Figure 5:
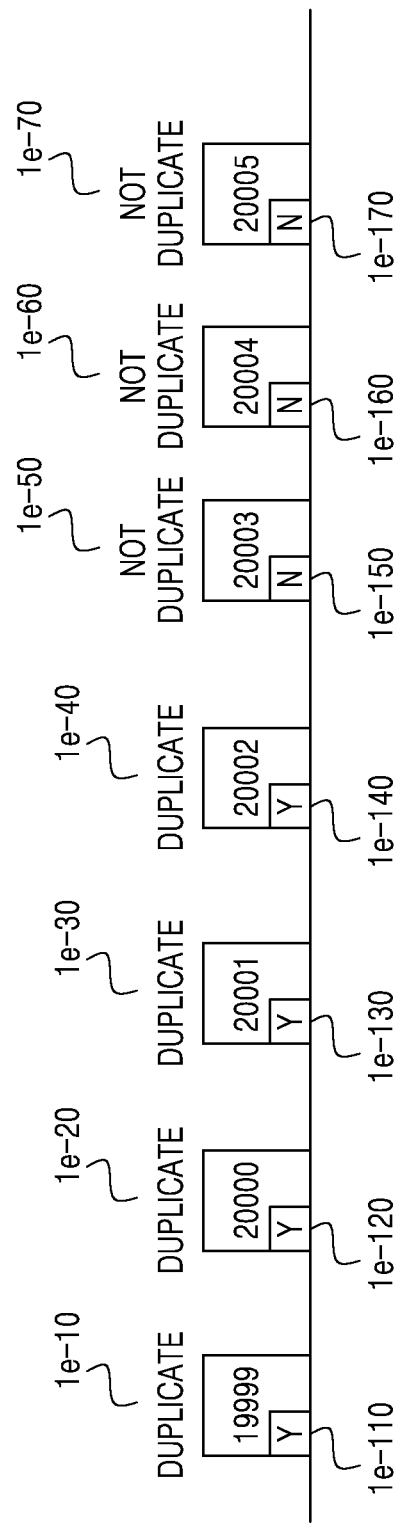
FIG. 5 is a diagram illustrating an operation process of a transmitter in which duplicate packet transmission is deactivated according to an embodiment of the disclosure.

FIG. 5 is a diagram illustrating an operation process of a transmitter in which duplicate packet transmission is deactivated according to an embodiment of the disclosure.

Referring to FIG. 5, after the duplicate packet transmission is activated, a duplication detection function or a reordering function of a receiver may be required. Because it is required for a PDCP layer of the receiver to identify an order of a packet, when the duplicate packet transmission is performed, an SN of a PDCP layer may be included in a PDCP header. When the duplicate packet transmission is deactivated or is not configured, the PDCP layer of the receiver may not use the duplication detection function and the reordering function. Therefore, the SN of the PDCP layer may not be necessarily allocated.

However, because a format of a PDCP header is fixed, and a field corresponding to an SN exists in the PDCP header, when packet duplication is deactivated or is not configured, SNs of corresponding packets may be sequentially allocated but the receiver may not need to use information about the SNs for duplication detection or reordering.

In an embodiment of the disclosure, a 1-bit indicator 1e-110, 1e-120, 1e-130, 1e-140, 1e-150, 1e-160, or 1e-170 indicating whether a packet of a corresponding SN is duplicated and duplicate transmitted when transmitting the packet may be included in a PDCP header. In an embodiment of the disclosure, the 1-bit indicator may be referred to as a packet duplication indicator. The receiver may recognize deactivation of packet duplication by interpreting the 1-bit indicator, and may not perform the receiver operation for duplicate packet transmission. In an embodiment of the disclosure, the receiver may perform an operation according to deactivation of the duplicate packet transmission.

Referring to FIG. 5, an example is illustrated, in which the transmitter continuously performs the duplicate packet transmission (1e-10, 1e-20, and 1e-30), and after transmission of a packet 1e-40 corresponding to an SN of 20002, the duplicate packet transmission is not required any more. The transmitter may not perform the duplicate packet transmission on packets 1e-50, 1e-60, and 1e-70 thereafter, and may transmit the packets 1e-50, 1e-60, and 1e-70 by including indicators 1e-150, 1e-160, and 1e-170 therein, the indicators 1e-150, 1e-160, and 1e-170 indicating the duplicate packet transmission is not performed.

Figure 6:
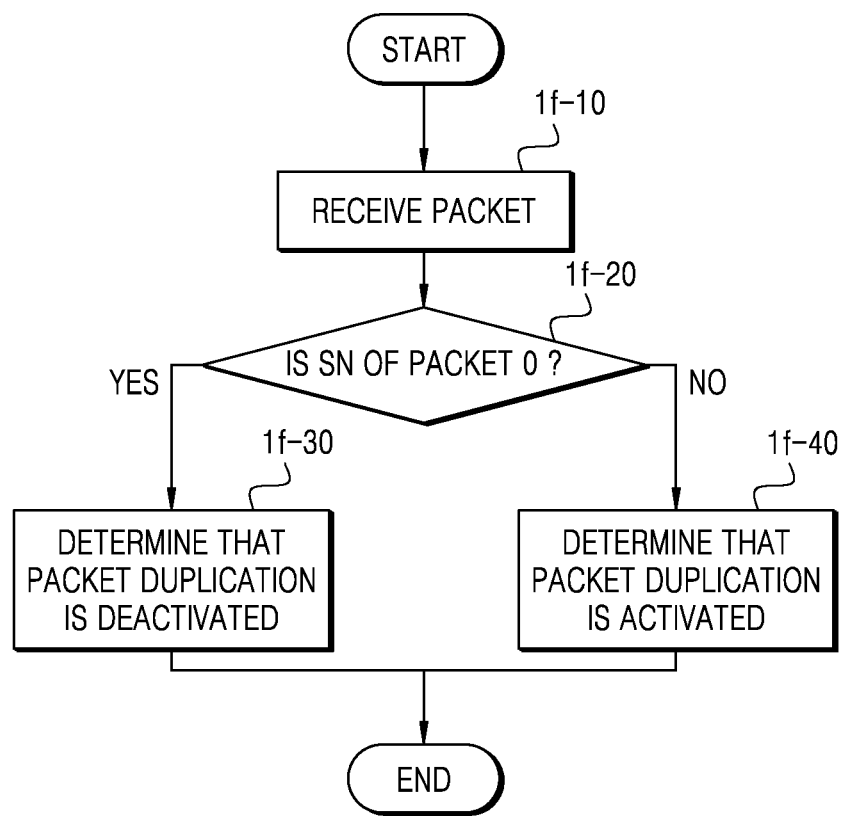
FIG. 6 is a flowchart illustrating an operation process of a receiver in which duplicate packet transmission is activated or deactivated according to an embodiment of the disclosure.

FIG. 6 is a flowchart illustrating an operation process of a receiver in which duplicate packet transmission is activated or deactivated according to an embodiment of the disclosure.

Referring to FIG. 6, the operation process of a receiver may be applied to a receiver operation corresponding to a transmitter operation of FIG. 3 or 4.

In operation 1f-10, a PDCP layer of the receiver receives a packet. In this regard, the PDCP layer of the receiver may read information in a PDCP header.

In operation 1f-20, it is determined whether a packet of which SN is 0 is received.

When the packet of which SN is 0 is received, in operation 1f-30, the receiver may determine that duplicate packet transmission is deactivated with respect to the packet or a radio bearer from which the packet is transmitted. When it is determined that the duplicate packet transmission is deactivated, the PDCP layer of the receiver of a terminal may perform a receiver operation corresponding to a state in which packet duplication is deactivated or is not configured. For example, the receiver may not use a duplication detection function or a reordering function of the PDCP layer. In an embodiment of the disclosure, the receiver may perform an operation of deactivating the packet duplication. For example, the receiver may perform an operation of starting a reordering timer.

When an SN of a received packet is not 0, in operation 1f-40, the receiver may determine that the duplicate packet transmission is activated and performed.

Figure 7:
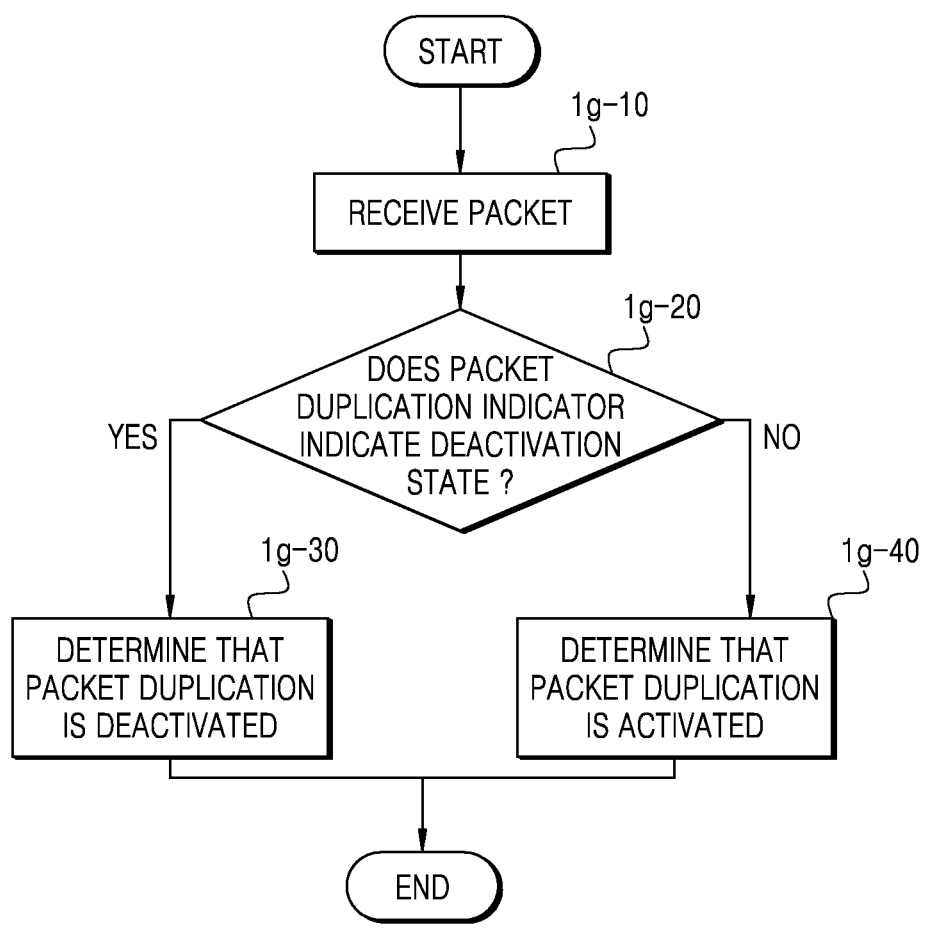
FIG. 7 is a flowchart illustrating an operation process of a receiver in which duplicate packet transmission is activated or deactivated according to an embodiment of the disclosure.

FIG. 7 is a flowchart illustrating an operation process of a receiver in which duplicate packet transmission is activated or deactivated according to an embodiment of the disclosure.

Referring to FIG. 7, an operation process of the receiver may be applied to a receiver operation corresponding to a transmitter operation of FIG. 5.

In operation 1g-10, the PDCP layer of the receiver receives a packet. In this regard, the PDCP layer of the receiver may read information in a PDCP header.

In operation 1g-20, the receiver may determine whether the packet duplication indicator 1e-110, 1e-120, 1e-130, 1e-140, 1e-150, 1e-160, or 1e-170 of the packet indicates that duplicate packet transmission is in a deactivation state.

When a packet duplication indicator of a received packet indicates the deactivation state, in operation 1g-30, the PDCP layer of the receiver may determine that duplicate packet transmission is deactivated with respect to the packet or a radio bearer from which the packet is transmitted. Afterward, the PDCP layer of the receiver of the terminal may perform a receiver operation corresponding to a state in which packet duplication is deactivated or is not configured. For example, the receiver may not use a duplication detection function or a reordering function of the PDCP layer. In an embodiment of the disclosure, the receiver may perform an operation of deactivating the packet duplication. For example, the receiver may perform an operation of initiating a reordering timer.

When the packet duplication indicator of the received packet does not indicate the deactivation state, in operation 1g-40, the PDCP layer of the receiver may determine that the packet has been duplicated by and duplicate transmitted from a PDCP layer of a transmitter. In addition, the receiver may determine that the packet duplication is activated at least up to a time when the packet is transmitted.

Figure 8:
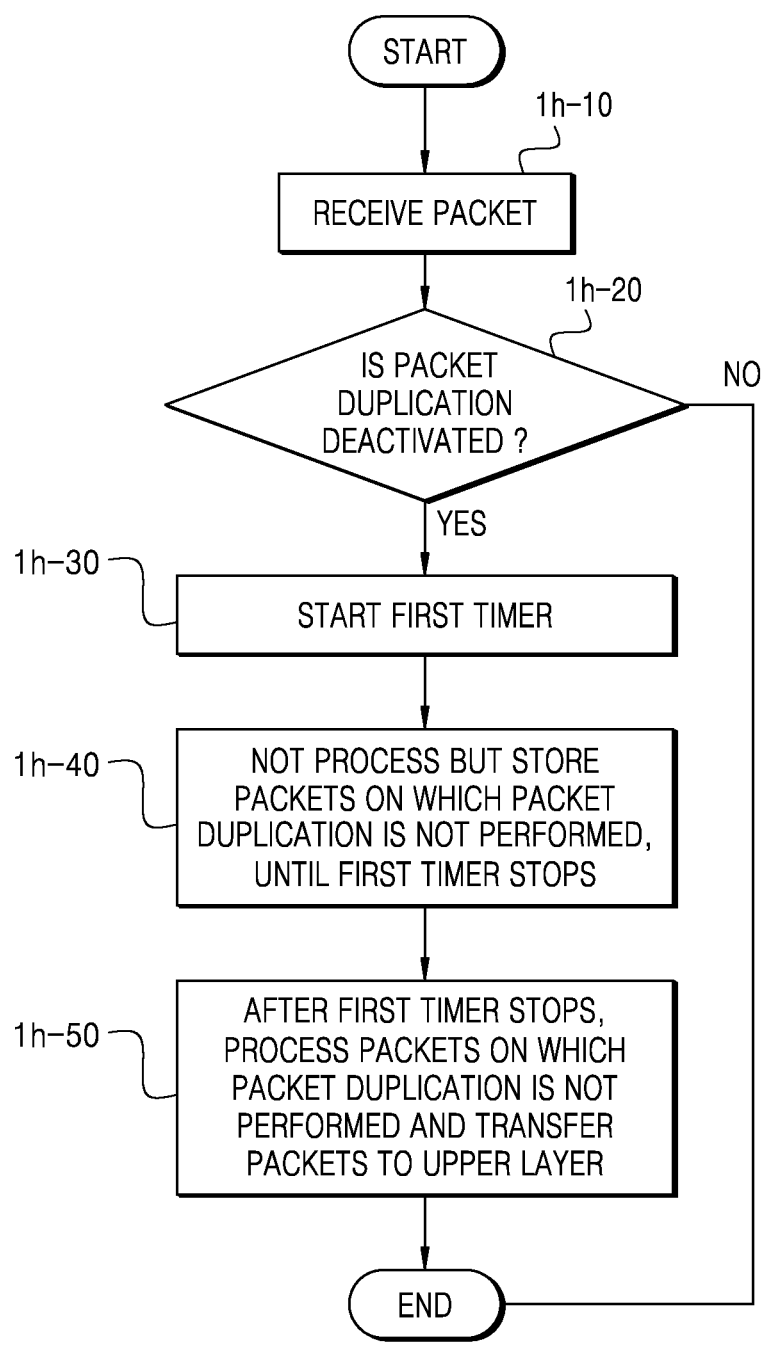
FIG. 8 is a flowchart illustrating an operation process of a receiver when duplicate packet transmission is deactivated according to an embodiment of the disclosure.

FIG. 8 is a flowchart illustrating an operation process of a receiver when duplicate packet transmission is deactivated according to an embodiment of the disclosure.

Referring to FIG. 8, in operation 1h-10, the PDCP layer of the receiver receives a packet.

In operation 1h-20, the PDCP layer of the receiver may determine whether duplicate packet transmission is deactivated. In an embodiment of the disclosure, the PDCP layer of the receiver may determine whether duplicate packet transmission is deactivated, by using the method described above with reference to FIGS. 3 to 7. Even when a PDCP layer of a transmitter decides deactivation of duplicate packet transmission and thus does not perform the duplicate packet transmission any more, the PDCP layer of the receiver may receive, during a certain time, one or more packets on which the duplicate packet transmission is performed, and thus a receiver operation according to the duplicate packet transmission has to be maintained during the certain time.

When the receiver determines that the duplicate packet transmission is deactivated, in operation 1h-30, the receiver may start a pre-set first timer. The receiver may perform, during a time of the first timer, operations of processing packets that have been transmitted by the transmitter while the duplicate packet transmission was activated. In this regard, the first timer may correspond to a reordering timer for reordering packets in the PDCP layer of the receiver. In an embodiment of the disclosure, the first timer may correspond to a separate timer, not the reordering timer. In addition, in an embodiment of the disclosure, a pre-set value may be used as a temporal length of a timer, or the temporal length of the timer may be received from a base station.

In operation $1h$-40, after the first timer starts, the PDCP layer of the receiver may not transfer, to an upper layer, packets on which packet duplication is not performed, but may store the packets. During the time, only packets on which the duplicate packet transmission is performed may be reordered and then transferred to the upper layer.

After the first timer stops, the receiver may determine that a packet on which the duplicate packet transmission is performed will not be received any more. After the determination, in operation $1h$-50, the PDCP layer of the receiver may process the packets on which the duplicate packet transmission is not performed and may transfer the packets to the upper layer.

Figure 9:
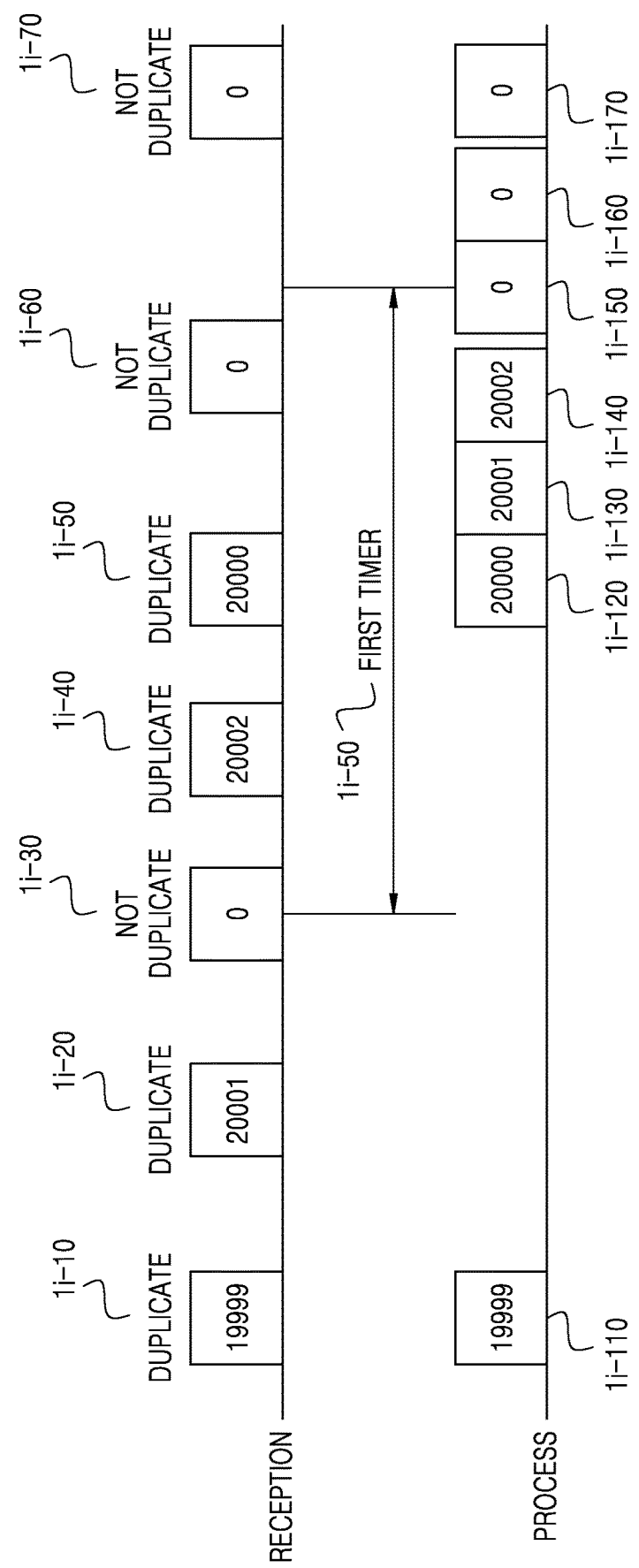
FIG. 9 is a diagram illustrating an operation process of a receiver when duplicate packet transmission is deactivated according to an embodiment of the disclosure.

FIG. 9 is a diagram illustrating an operation process of a receiver when duplicate packet transmission is deactivated according to an embodiment of the disclosure.

Referring to FIG. 9, an example is illustrated in which, as in an embodiment of the disclosure described with reference to FIG. 3, an SN of a PDCP layer is included in duplicate packet transmission, and an SN of 0 is used when the terminal device is not performed. However, an embodiment of FIG. 9 is not limited thereto, and thus may be applied to a general case in which a packet on which duplicate packet transmission is performed is received and then the duplicate packet transmission is deactivated.

Referring to FIG. 9, the PDCP layer of the receiver receives a packet $1i$-10 for which duplicate packet transmission with an SN of 19999 is set. When reordering with respect to the packet is completed, the receiver may immediately process and transfer ($1i$-110) the packet $1i$-10 to an upper layer. Afterward, the PDCP layer of the receiver receives a packet $1i$-20 for which duplicate packet transmission with an SN of 20001 is set. Because a packet of which SN is 20000 is not received when the packet $1i$-20 is received, the packet $1i$-20 may not be processed for a reordering operation but may be stored in the receiver.

In an embodiment of the disclosure, it is assumed that a packet $1i$-30 of which SN is 0 and on which duplicate packet transmission is not performed is received. At this point, the terminal that is the receiver may determine that the duplicate packet transmission is deactivated.

In this regard, the receiver may start a first timer $1i$-50 to receive, during a certain time, one or more packets on which the duplicate packet transmission is performed. Afterward, it is assumed that a packet $1i$-40 of which SN is 20002, and a packet $1i$-50 of which SN is 20000 are received. Because reordering with respect to packets of which SNs are up to 20002 has been completed when the packet $1i$-50 of which SN is 20000 is received, from the packet $1i$-50 of which SN is 20000 to the packet $1i$-40 of which SN is 20002 may be processed by the PDCP layer of the receiver and may be transferred ($1i$-120, $1i$-130, and $1i$-140) to the upper layer. Afterward, even when a packet $1i$-60 of which SN is 0 and on which the duplicate packet transmission is not performed is received, because the first timer is operating, the packet $1i$-60 may not be processed and may be only stored. Afterward, after the first timer stops, stored packets may be transferred ($1i$-150 and $1i$-160) to the upper layer according to an order of reception. After the first timer stops, the duplicate packet transmission is not performed, and thus a packet $1i$-70 of which SN is 0 may be immediately processed upon reception and then may be transferred ($1i$-170) to the upper layer.

Figure 10:
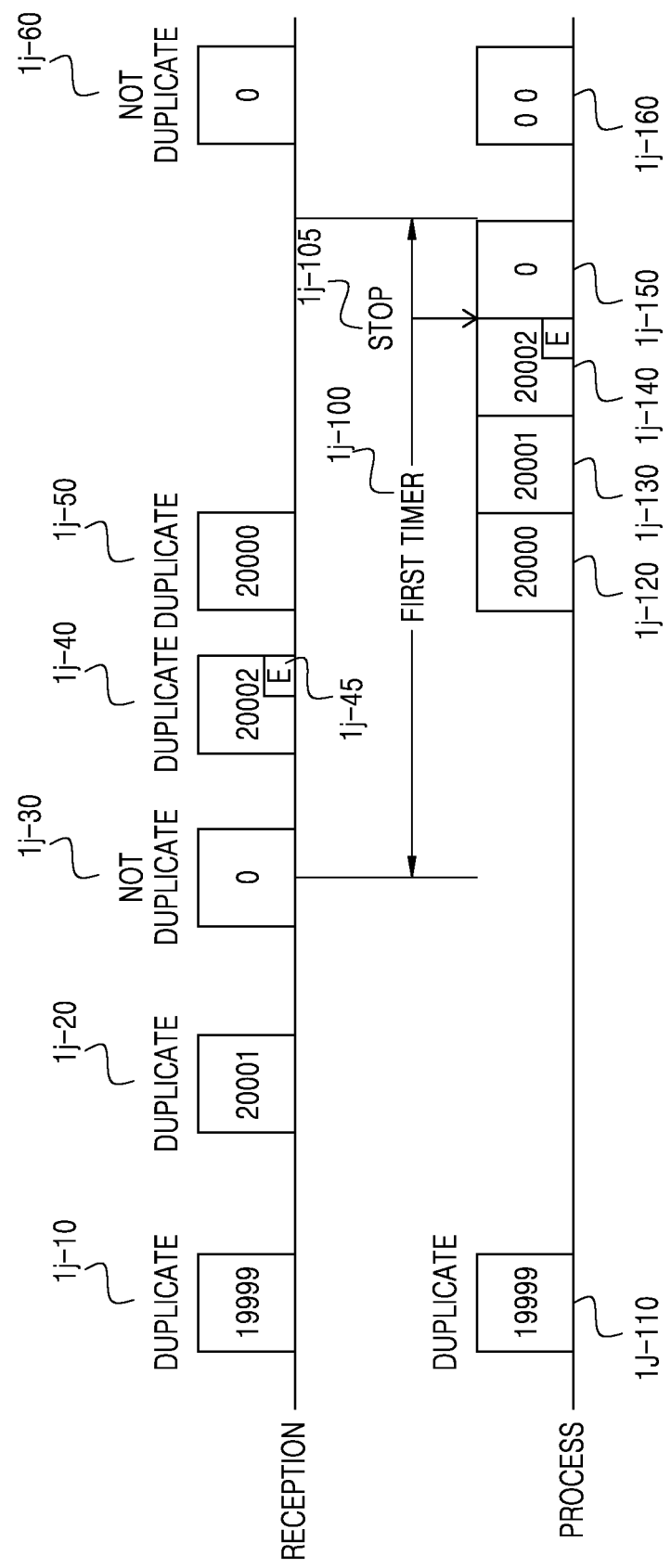
FIG. 10 is a diagram illustrating an operation process of a receiver when duplicate packet transmission is deactivated according to an embodiment of the disclosure.

FIG. 10 is a diagram illustrating an operation process of a receiver when duplicate packet transmission is deactivated according to an embodiment of the disclosure.

Referring to FIG. 10, an example is illustrated in which, as in an embodiment of the disclosure described with reference to FIG. 3, an SN of a PDCP layer is included in duplicate packet transmission, and an SN of 0 is used when the terminal device is not performed. However, an embodiment of FIG. 10 is not limited thereto, and thus may be applied to a general case in which a packet on which duplicate packet transmission is performed is received and then the duplicate packet transmission is deactivated.

Referring to FIG. 10, the PDCP layer of the receiver receives a packet $1j$-10 for which duplicate packet transmission with an SN of 19999 is set. When reordering with respect to the packet is completed, the receiver may immediately process and transfer ($1j$-110) the packet $1j$-10 to an upper layer. Afterward, the receiver receives a packet $1j$-20 for which duplicate packet transmission with an SN of 20001 is set. Because a packet of which SN is 20000 is not received when the packet $1j$-20 is received, the packet $1j$-20 may not be processed for a reordering operation but may be stored in the receiver.

In an embodiment of the disclosure, it is assumed that a packet $1j$-30 of which SN is 0 and on which duplicate packet transmission is not performed is received. At this point, the terminal that is the receiver may determine that the duplicate packet transmission is deactivated.

In this regard, the receiver may start a first timer $1j$-100 to receive, during a certain time, one or more packets on which the duplicate packet transmission is performed. Afterward, it is assumed that a packet $1j$-40 of which SN is 20002, and a packet $1j$-50 of which SN is 20000 are received. Because reordering with respect to packets of which SNs are up to 20002 has been completed when the packet $1j$-50 of which SN is 20000 is received, from the packet $1j$-50 of which SN is 20000 to the packet $1j$-40 of which SN is 20002 may be processed by the PDCP layer of the receiver and may be transferred ($1j$-120, $1j$-130, and $1j$-140) to the upper layer.

In an embodiment of the FIG. 10, it is assumed that an end marker $1j$-45 indicating that the packet $1j$-40 of which SN is 20002 is a last packet on which the duplicate packet transmission is performed is inserted to a PDCP header of the packet $1j$-40 of which SN is 20002. When the packet $1j$-40 including the end marker $1j$-45 is received, the PDCP layer of the receiver may identify the packet $1j$-40 that is a last packet on which the duplicate packet transmission is performed. Therefore, when a reordering process is completed up to the packet, the receiver does not need to perform a receiver operation for duplicate packet transmission. Therefore, the PDCP layer of the receiver may stop the first timer $1j$-100 at $1j$-105 after processing the packet $1j$-40 of which SN is 20002.

At this time, the stored packet $1j$-30 on which the duplicate packet transmission is not performed may be processed and transferred ($1j$-150) to the upper layer. After the first timer stops at $1j$-105, the duplicate packet transmission is not performed, and thus a packet $1j$-60 of which SN is 0 may be immediately processed upon reception and then may be transferred ($1j$-160) to the upper layer.

Figure 11:
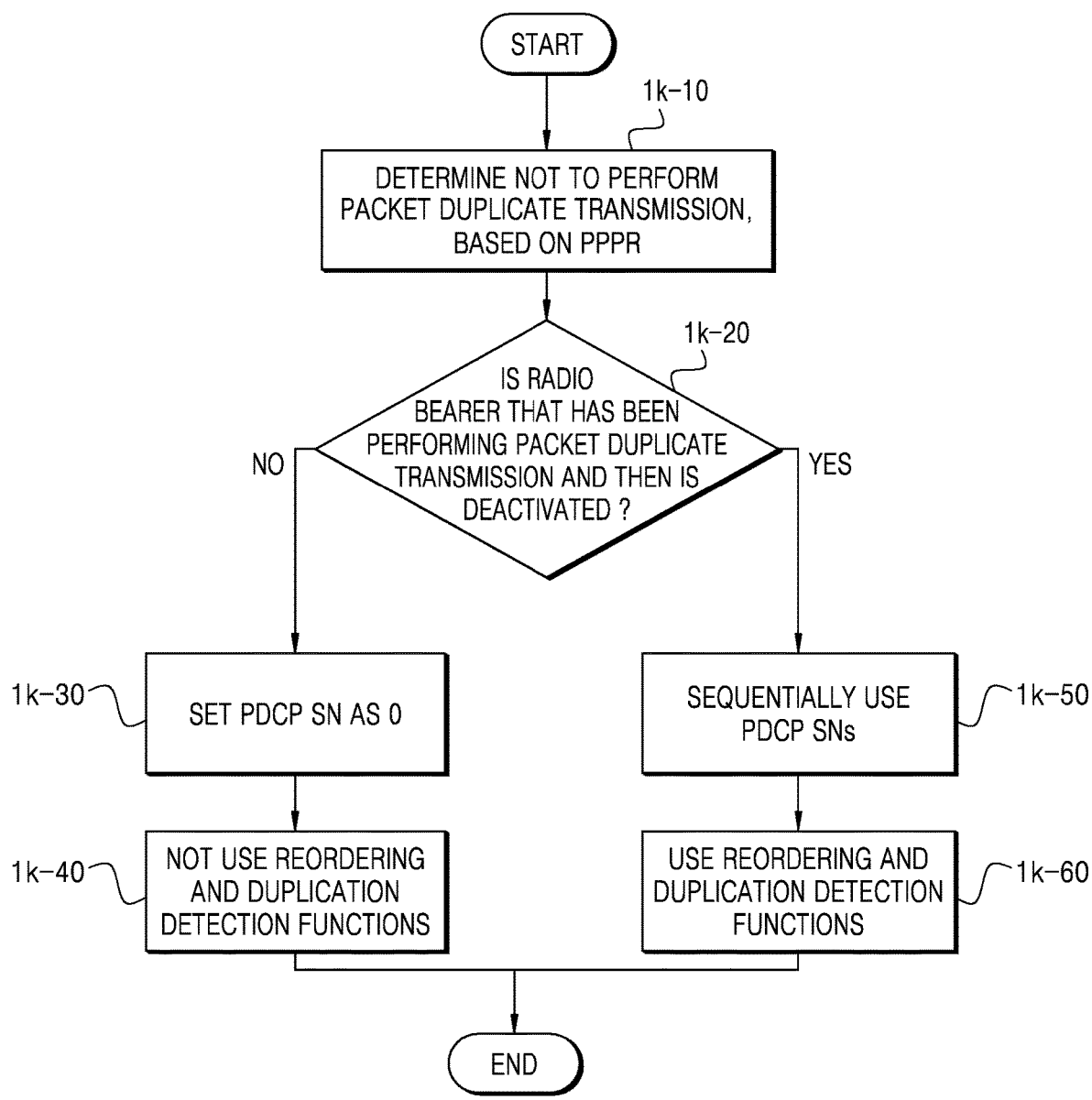
FIG. 11 is a flowchart illustrating operations of a transmitter and a receiver according to whether duplicate packet transmission is to be performed according to an embodiment of the disclosure.

FIG. 11 is a flowchart illustrating operations of a transmitter and a receiver according to whether duplicate packet transmission is to be performed according to an embodiment of the disclosure.

Referring to FIG. 11, a packet that arrives at a PDCP layer of the transmitter may have a QoS requirement to be processed by the packet. The QoS requirement may include a function index, such as a reliability level, a packet error rate, a delay time, or the like, or may correspond to a representative value indicating the QoS requirement. In an embodiment of FIG. 11, as an example, a method of determining whether to perform packet duplication, based on a PPPR used in V2X communication, is illustrated. In the V2X communication, a PPPR value may represent a QoS requirement of a packet to be transmitted.

When a packet arrives at the PDCP layer of the transmitter, the PDCP layer may determine a PPPR value of the packet. In operation 1k-10, the transmitter may determine whether duplicate packet transmission is to be performed, based on the determined PPPR value. In an embodiment of the disclosure, when the PPPR value of the packet is less than or is equal to or less than a threshold value at which the duplicate packet transmission is requested, the PDCP layer of the transmitter may determine that the duplicate packet transmission is not requested, and thus may not duplicate the packet and may transfer the packet to only one RLC entity.

In operation 1k-20, the transmitter may determine whether a radio bearer has been performing the duplicate packet transmission and then is deactivated. When the radio bearer is not a radio bearer that has been performing the duplicate packet transmission and then is deactivated, it means that the radio bearer did not perform the duplicate packet transmission from a start point. At this time, a PDCP SN is not required, and thus, in operation 1k-30, the PDCP SN may be set as 0.

In addition, because it is not required for a PDCP layer of the receiver to use a reordering function and a duplication detection function, in operation 1k-40, the receiver may not use the reordering function and the duplication detection function.

Otherwise, when the radio bearer is a radio bearer that has been performing the duplicate packet transmission and then is deactivated, and when a receiver operation is not changed, a PDCP SN may be required. Therefore, in operation 1k-50, the PDCP SN may be continuously used. In addition, in operation 1k-60, the PDCP layer of the receiver may continuously use the reordering function and the duplication detection function.

Figure 12:
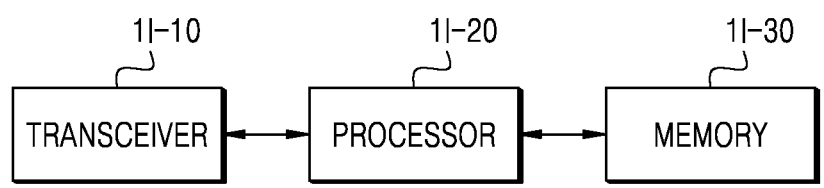
FIG. 12 illustrates a block diagram of a terminal according to an embodiment of the disclosure.

FIG. 12 illustrates a block diagram of a terminal according to an embodiment of the disclosure.

Referring to FIG. 12, the terminal may include a transceiver 11-10, a processor 11-20, and a memory 11-30. In an embodiment of the disclosure, the processor 11-20 may be defined as an integrated circuit or at least one processor dedicated to a circuit or an application.

The transceiver 11-10 may transceive a signal to/from another network entity. For example, the transceiver 11-10 may receive, from a base station, system information, and at least one of a synchronization signal or a reference signal.

The processor 11-20 may control general operations of the terminal according to embodiments of the disclosure. For example, the processor 11-20 may control a signal flow between blocks to perform operations described with reference to drawings.

The memory 11-30 may store at least one of information transceived through the transceiver 11-10 or information generated by the processor 11-20. In addition, the memory 11-30 may provide stored data, in response to a request from the processor 11-20. The memory 11-30 may be configured as a storage medium or a combination of storage media including read-only memory (ROM), random-access memory (RAM), a hard disk, compact disc-ROM (CD-ROM), digital versatile disc (DVD), or the like. In addition, the memory 11-30 may include a plurality of memories.

Figure 13:
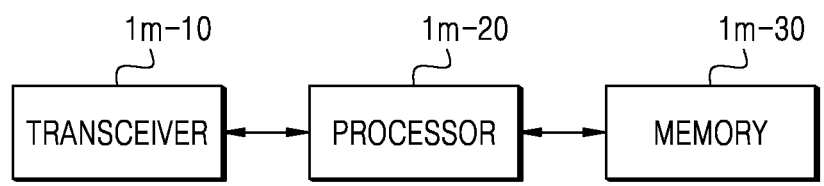
FIG. 13 illustrates a block diagram of a base station according to an embodiment of the disclosure.

FIG. 13 illustrates a block diagram of a base station according to an embodiment of the disclosure.

Referring to FIG. 13, the base station may include a transceiver 1m-10, a processor 1m-20, and a memory 1m-30. In an embodiment of the disclosure, the processor 1m-20 may be defined as an integrated circuit or at least one processor dedicated to a circuit or an application.

The transceiver 1m-10 may transceive a signal to/from another network entity. For example, the transceiver 1m-10 may transmit, to a terminal, system information, and at least one of a synchronization signal or a reference signal.

The processor 1m-20 may control general operations of the base station according to embodiments of the disclosure. For example, the processor 1m-20 may control a signal flow between blocks to perform operations described with reference to drawings.

The memory 1m-30 may store at least one of information transceived through the transceiver 1m-10 or information generated by the processor 1m-20.

Figure 14:
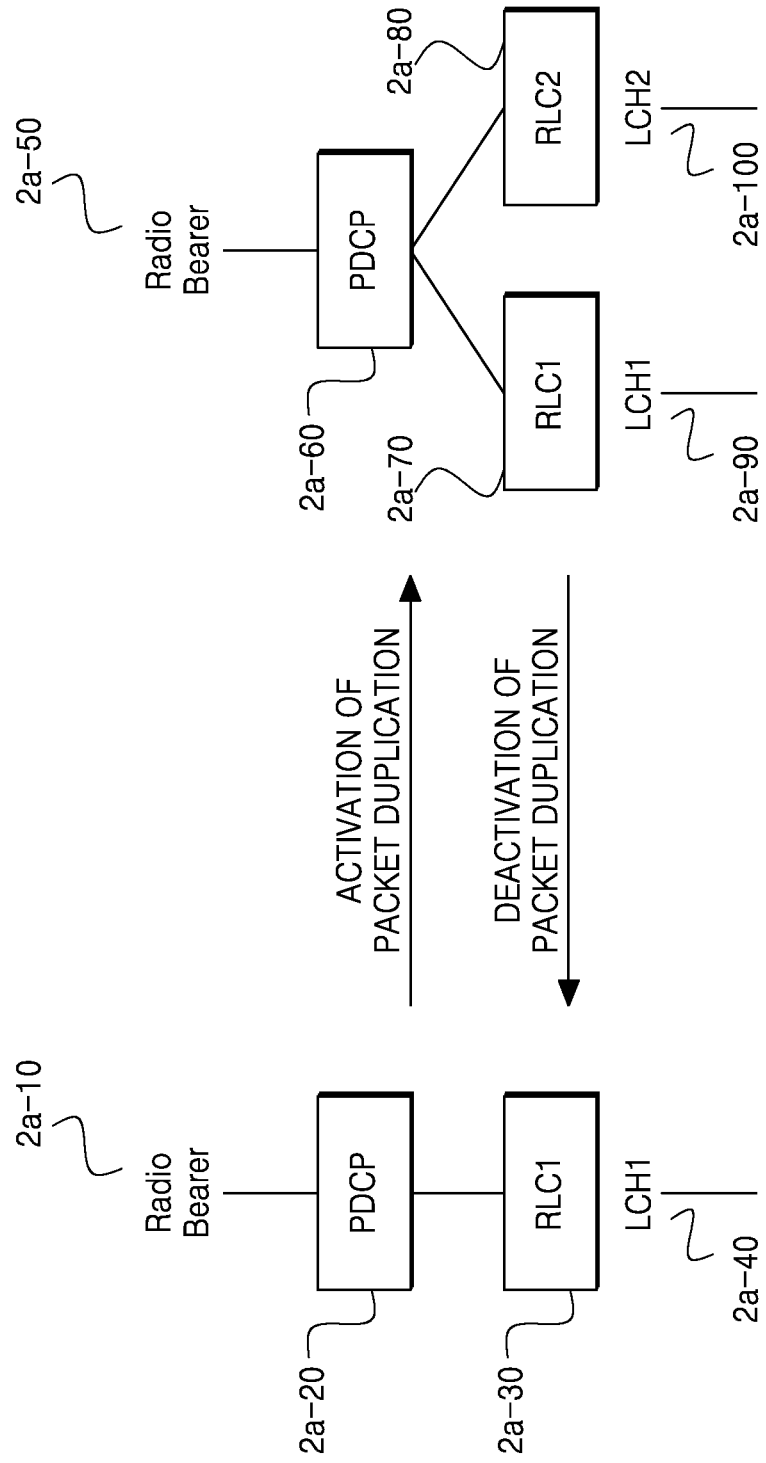
FIG. 14 is a diagram illustrating a change in a radio bearer configuration according to whether duplicate packet transmission is to be performed according to an embodiment of the disclosure.

FIG. 14 is a diagram illustrating a change in a radio bearer configuration according to whether duplicate packet transmission is to be performed according to an embodiment of the disclosure.

Referring to FIG. 14, a radio bearer 2a-10 that does not perform duplicate packet transmission may be connected to a PDCP layer 2a-20 and an RLC entity 2a-30 (also referred to as the RLC1 2a-30). In this regard, each RLC entity may correspond to a logical channel, and the RLC1 2a-30 may correspond to a LCH1 2a-40.

When a terminal does not perform the duplicate packet transmission, a packet that arrives at the radio bearer 2a-10 may not be packet-duplicated by the PDCP layer 2a-20, a PDCP header may be added thereto, and then the packet may be transferred to the RLC entity 2a-30. In addition, an RLC header may be added to the packet by the RLC entity 2a-30, and the packet may be transmitted through the LCH1 2a-40. In an embodiment of the disclosure, an RLC entity of a receiver may identify an RLC entity of each packet by using a LCID included in each MAC subheader, such that the packet may be transferred to the RLC entity 2a-30. After the RLC header is removed, the packet may be transferred to the PDCP layer 2a-20 and thus the PDCP header may be removed.

In an embodiment of the disclosure, duplicate packet transmission may be activated due to various reasons including settings of a base station, self-determination by the terminal, or the like. In this regard, a radio bearer 2a-50 may be connected to a PDCP layer 2a-60 and at least two RLC entities 2a-70 and 2a-80 (also referred to as the RLC1 2a-70 and the RLC2 2a-80). In an embodiment of FIG. 14, two RLC entities are shown as an example, but the number of RLC entities in the disclosure is not limited thereto and thus may extend to two or more RLC entities. Each RLC entity may correspond to a logical channel, and the RLC1 2a-70 and the RLC2 2a-80 may correspond to a LCH1 2a-90 and a LCH2 2a-100 (also referred to as the LCH 2a-90 and the LCH 2a-100), respectively. When the terminal performs the duplicate packet transmission, packet duplication may be performed on a packet by the PDCP layer 2a-60, the packet arriving at the radio bearer 2a-50, and a PDCP header may be added to each of the packets, and then the respective packets may be transferred to the RLC entities 2a-70 and 2a-80. The RLC entities 2a-70 and 2a-80 may each add an RLC header to the respective packets, and may transmit the packets through the LCHs 2a-90 and 2a-100, respectively.

An RLC entity of a receiver may identify an RLC entity of each packet by using an LCID included in each MAC subheader, such that the respective packets may be transferred to the RLC entities 2a-70 and 2a-80. After the RLC header of each of the packets is removed, the packets may be transferred to the PDCP layer 2a-60 and thus the PDCP header may be removed.

In an embodiment of the disclosure, because a same packet may be received from each of RLC entities, a PDCP layer may perform a duplication detection function and thus may prevent the same packet from being transferred to an upper layer several times. In addition, because a time when a packet is transferred from each RLC entity is not regular, the PDCP layer may perform a reordering function so as to allow packets to be transferred from a PDCP layer of the receiver to an upper layer according to an order, the packets being transmitted from a PDCP layer of a transmitter. For the duplication detection or the reordering function which is described above, it is required for the PDCP layer of the receiver to identify an order of packets, and thus, when duplicate packet transmission is performed, a SN of a PDCP layer may be included in a PDCP header.

Figure 15:
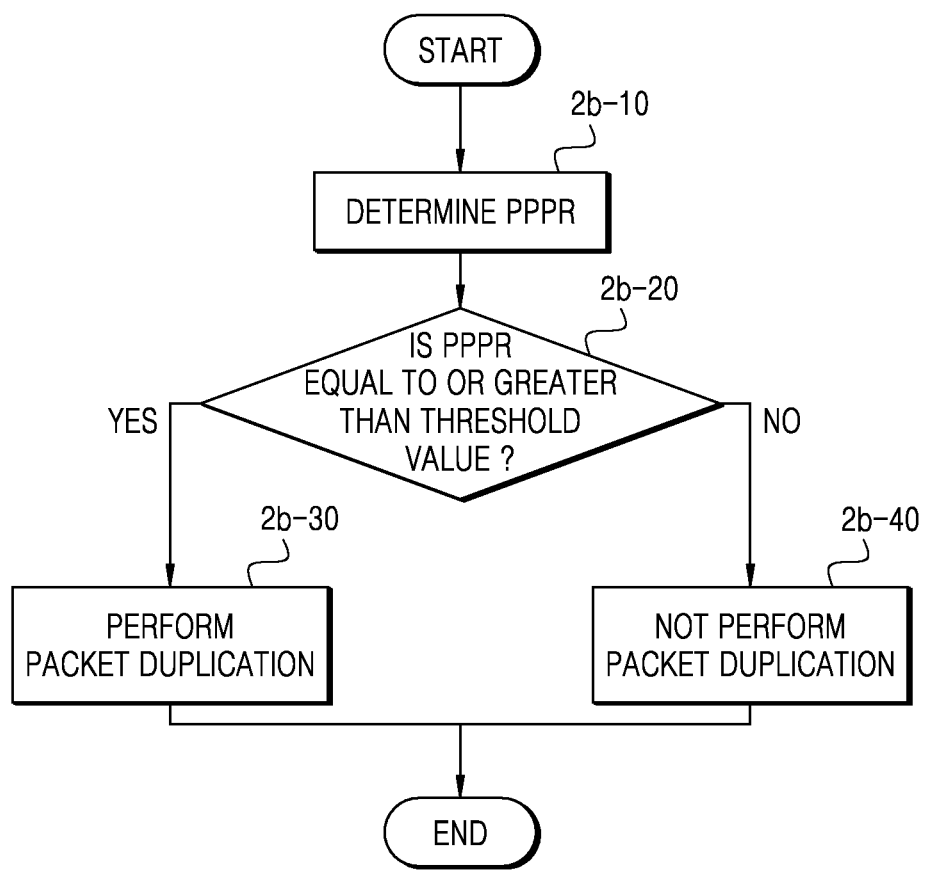
FIG. 15 is a flowchart illustrating a process of determining packet duplication, the process being performed by a PDCP layer of a transmitter according to an embodiment of the disclosure.

FIG. 15 is a flowchart illustrating a process of determining packet duplication, the process being performed by a PDCP layer of a transmitter according to an embodiment of the disclosure.

Referring to FIG. 15, a packet that arrives at the PDCP layer of the transmitter may have a QoS requirement to be processed by the packet. The QoS requirement may include a function index, such as a reliability level, a packet error rate, a delay time, or the like, or may correspond to a representative value indicating the QoS requirement.

In an embodiment of FIG. 15, as an example, a method of determining whether to perform packet duplication, based on a PPPR used in V2X communication, is illustrated. In the V2X communication, a PPPR value may represent a QoS requirement of a packet to be transmitted.

In operation 2b-10, when a packet arrives at the PDCP layer of the transmitter, the PDCP layer may determine a PPPR value of the packet.

In operation 2b-20, the PPPR value of the packet may be compared with a threshold value at which duplicate packet transmission is requested.

When the PPPR value of the packet is equal to or greater than or exceeds the threshold value at which the duplicate packet transmission is requested, in operation 2b-30, the PDCP layer of the transmitter may determine that the duplicate packet transmission is requested. The PDCP layer of the transmitter may duplicate the packet and may transfer packets to at least two RLC entities for transmission.

When the PPPR value of the packet is less than the threshold value at which the duplicate packet transmission is requested, in operation 2b-40, the PDCP layer of the transmitter may determine that the duplicate packet transmission is not requested. The PDCP layer of the transmitter may not duplicate the packet and may transfer the packet to only one RLC entity.

Figure 16:
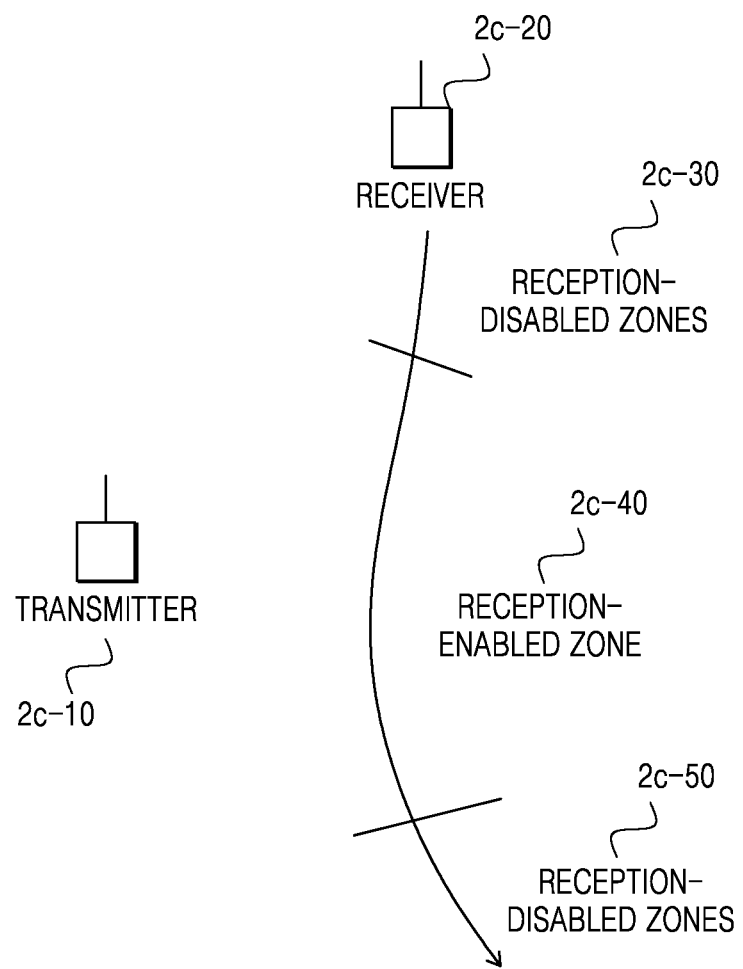
FIG. 16 is a diagram illustrating a mobility scenario of a transmitter and a receiver in vehicle communication according to an embodiment of the disclosure.

FIG. 16 is a diagram illustrating a mobility scenario of a transmitter and a receiver in vehicle communication according to an embodiment of the disclosure.

In an embodiment of the disclosure, in the vehicle communication, a transmitter and a receiver may each have mobility, and transceiving may become unavailable due to movement of the transmitter or the receiver.

Referring to FIG. 16, a scenario in which the transmitter 2c-10 does not move but the receiver 2c-20 moves is illustrated. Referring to FIG. 16, at a start point, the receiver 2c-20 is present in a zone 2c-30 where the receiver 2c-20 cannot receive a packet transmitted from the transmitter 2c-10. As the receiver 2c-20 continuously moves, the receiver 2c-20 may move to a zone 2c-40 where the receiver 2c-20 can receive a packet transmitted from the transmitter 2c-10. In the zone 2c-40, the receiver 2c-20 receives the packet transmitted from the transmitter 2c-10, but it is not guaranteed that the receiver 2c-20 receives packets starting from a packet that was first transmitted from the transmitter 2c-10. In other words, the transmitter 2c-10 might be transmitting packets from a previous time, the receiver 2c-20 cannot receive packets transmitted from the transmitter 2c-10 when the receiver 2c-20 is present in the reception-disabled zones 2c-30 and 2c-50, and only after the receiver 2c-20 enters the reception-enabled zone 2c-40, the receiver 2c-20 can receive a packet. Referring to FIG. 16, as the receiver 2c-20 continuously moves, the receiver 2c-20 moves from the reception-enabled zone 2c-40 with respect to the transmitter 2c-10 to the reception-disabled zone 2c-50. A phenomenon in which the receiver 2c-20 could not and then can receive a packet from the transmitter 2c-10 may occur due to mobility of the transmitter 2c-10 or the receiver 2c-20, but the phenomenon may occur due to an operation of the receiver 2c-20, in which the receiver 2c-20 does not receive a packet due to necessity and then starts receiving a packet.

Figure 17:
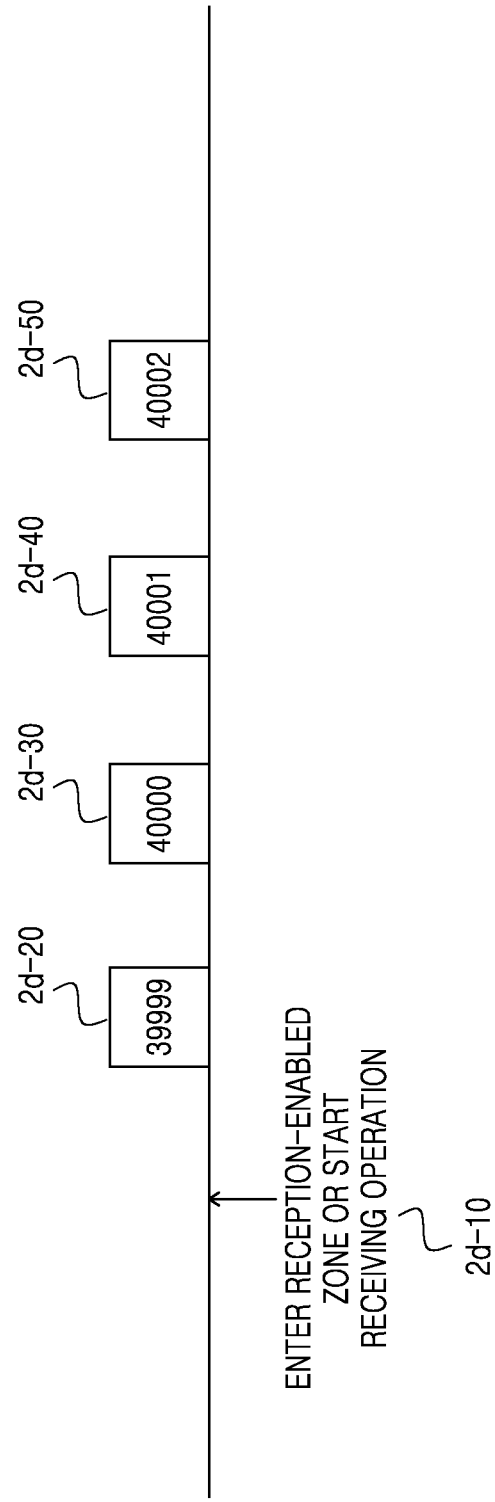
FIG. 17 is a diagram illustrating a method of receiving a packet, the method being performed by a PDCP layer of a receiver according to an embodiment of the disclosure.

FIG. 17 is a diagram illustrating a method of receiving a packet, the method being performed by a PDCP layer of a receiver according to an embodiment of the disclosure.

As described above with reference to FIG. 16, when the receiver enters a reception-enabled zone or starts a receiving operation (2d-10), the receiver may not receive packets starting from a packet that was first transmitted from the transmitter.

Referring to FIG. 17, an example is illustrated, in which the receiver receives a packet 2d-20 of which SN is 39999. In this regard, the receiver has to perform processing starting from the packet 2d-20 with the SN of 39999.

Referring to FIG. 17, it is assumed that the receiver has received a packet 2d-30 of which SN is 40000, a packet 2d-40 of which SN is 40001, and a packet 2d-50 of which SN is 40002. In an embodiment of the disclosure, the packets 2d-20, 2d-30, 2d-40, and 2d-50 for which SNs are allocated may be used for a case where packet duplication is activated. In another embodiment of the disclosure, the packets 2d-20, 2d-30, 2d-40, and 2d-50 for which SNs are allocated may be used when encryption is performed or a reordering operation is required. The receiver sequentially receives packets after the packet 2d-20 with the SN of 39999, but the disclosure is not limited thereto. Sequential reception of packets by the receiver cannot be guaranteed due to reasons of duplicate packet transmission, split bearer, or the like, and the disclosure may also be applied to a case of nonsequential reception.

Figure 18:
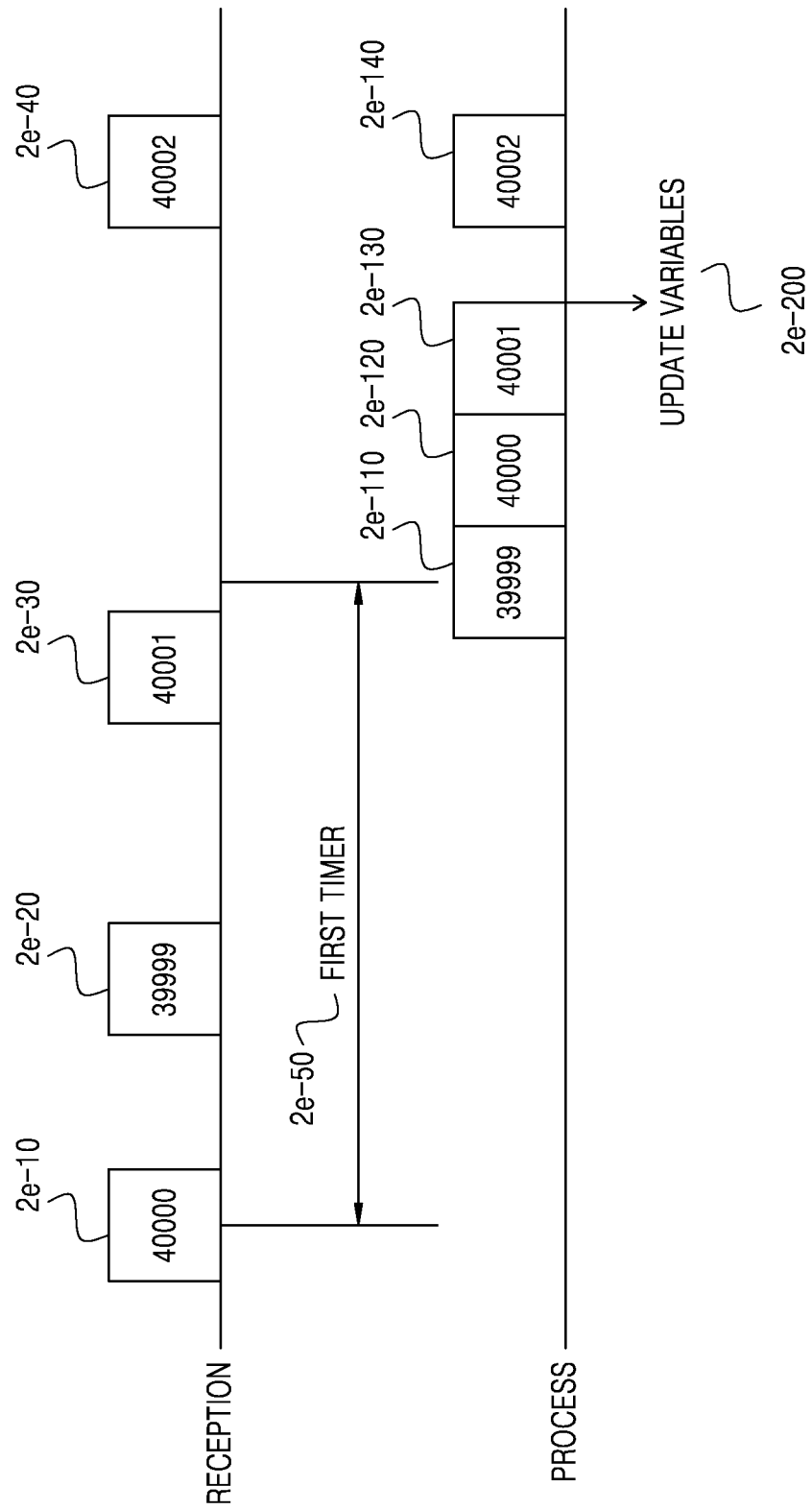
FIG. 18 is a diagram illustrating an operation of starting reception, the operation being performed by a PDCP layer of a receiver according to an embodiment of the disclosure.

FIG. 18 is a diagram illustrating an operation of starting reception, the operation being performed by a PDCP layer of a receiver according to an embodiment of the disclosure.

As described above with reference to FIG. 16, when the receiver enters a reception-enabled zone or starts a receiving operation, the receiver may not receive packets starting from a packet that was first transmitted from the transmitter.

Referring to FIG. 18, an example is illustrated, in which a packet that the PDCP layer of the receiver first receives is a packet 2e-10 with an SN of 40000.

In this regard, the PDCP layer of the receiver may start a first timer 2e-50 so as to wait for a packet that was transmitted prior to the packet 2e-10 with the SN of 40000. While the first timer 2e-50 operates, the receiver may process the packet 2e-10 with the SN of 40000, a packet 2e-20 with an SN of 39999, and a packet 2e-30 with an SN of 40001 and may store them without transferring them to an upper layer. In an embodiment of the disclosure, the first timer 2e-50 may be a reordering timer or a separately defined timer. Duration of the first timer 2e-50 may be a value randomly determined by the terminal or may be a value preset by the base station.

After the first timer 2e-50 stops, the PDCP layer of the receiver may reorder the stored packets 2e-10, 2e-20, and 2e-30 and may transfer (2e-110, 2e-120, and 2e-130) them to the upper layer. Thereafter, variables of the PDCP layer of the receiver may be updated based on the packets 2e-10, 2e-20, and 2e-30. For example, the PDCP layer of the receiver may update Last_Submitted_PDCP_RX_SN to 40001 that is the latest PDCP SN transferred to the upper layer. In another example, Next_PDCP_RX_SN may be updated to 40002 that is predicted to arrive according to a sequential order. In addition, various methods of updating variables may be available.

Afterward, when a packet 2e-40 of which SN is 40002 arrives, the PDCP layer of the receiver may process the packet 2e-40 according to a PDCP operation of the receiver and then may transfer (2e-140) it to the upper layer.

In an embodiment of the disclosure, the PDCP layer of the receiver may start the first timer 2e-50 at a time when the packet 2e-10 with the SN of 40000 that is predicted to arrive first actually arrives, and may set Next_PDCP_RX_SN as 40001 that is obtained by adding 1 to the SN of the packet 2e-10 that arrives first. In addition, the PDCP layer of the receiver may set Reordering_PDCP_RX_COUNT for reordering as a COUNT value that is calculated by using Next_PDCP_RX_SN and a Hyper Frame Number (HFN) value. In this regard, a value of Last_Submitted_PDCP_RX_SN may be set as a value preceding, by a certain number, 40000 that is the SN of the packet 2e-10 that arrives first. For example, the value of Last_Submitted_PDCP_RX_SN may be set as 30000 obtained by subtracting 10000 from 40000 that is the SN of the packet 2e-10 that arrives first. In this regard, an operation of updating a variable 2e-200 after the first timer 2e-50 stops may be performed by a reordering operation of the PDCP layer of the receiver, and is matched with a result of FIG. 18.

Figure 19:
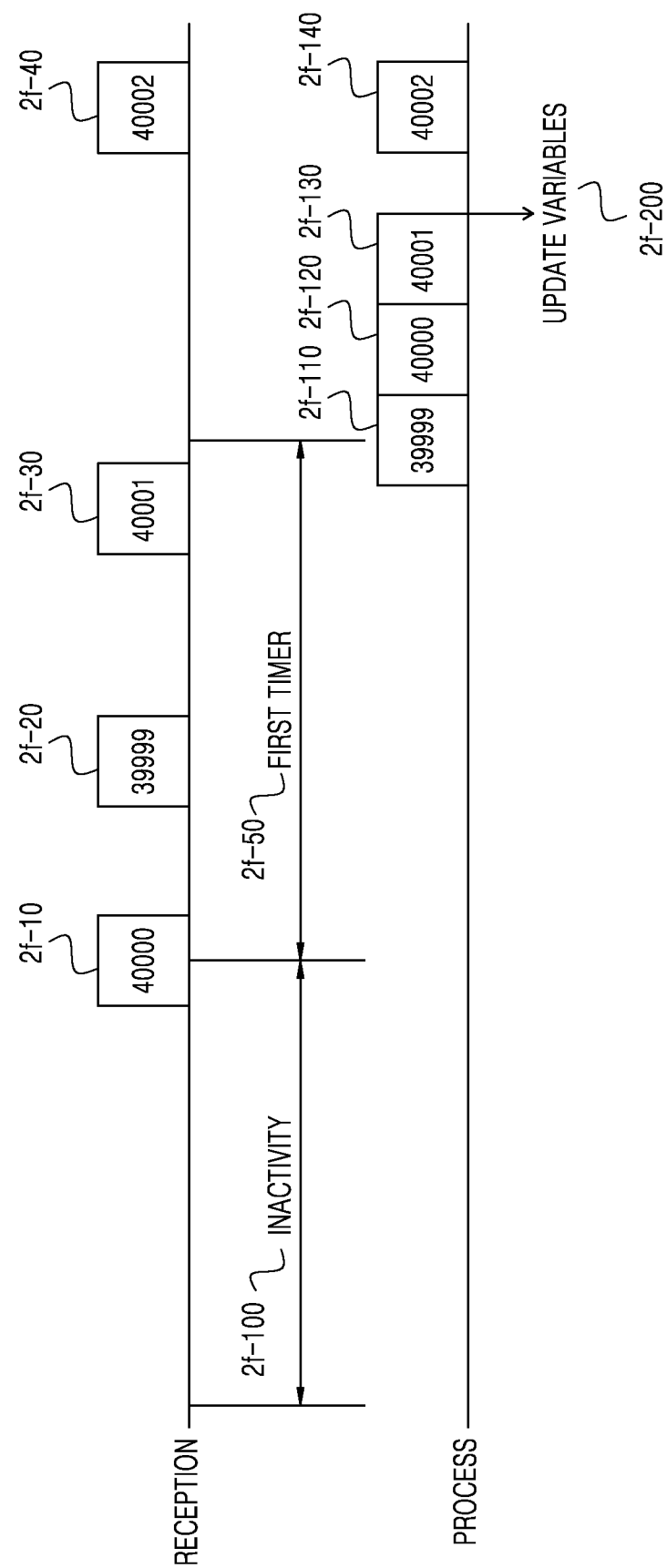
FIG. 19 is a diagram illustrating an operation of starting reception, the operation being performed by a PDCP layer of a receiver according to an embodiment of the disclosure.

FIG. 19 is a diagram illustrating an operation of starting reception, the operation being performed by a PDCP layer of a receiver according to an embodiment of the disclosure.

As described above with reference to FIG. 16, when the receiver enters a reception-enabled zone or starts a receiving operation, the receiver may not receive packets starting from a packet that was first transmitted from the transmitter.

Referring to FIG. 19, an example is illustrated, in which a packet that the PDCP layer of the receiver first receives is a packet 2f-10 with an SN of 40000.

In this regard, when the receiver receives the packet 2f-10 with the SN of 40000, it is required for the receiver to identify whether the packet 2f-10 is normally received or is an outdated packet of which validity is expired in previous reception. To this end, when a packet exceeding a PDCP reception window arrives at receiver, the PDCP layer of the receiver may determine whether a state in which a corresponding radio bearer does not receive a packet has been maintained during a preset time 2f-100. The preset time 2f-100 may be randomly set by the terminal, may be a default set time of a system, or may be set by the base station.

In a case where the receiver receives a packet, when packet reception did not occur during a previous certain time, the PDCP layer of the receiver may start a first timer 2f-50 so as to wait for a packet that has been transmitted, by the transmitter, prior to the packet 2f-10 with the SN of 40000. While the first timer 2f-50 operates, the receiver may process the packet 2f-10 with the SN of 40000, a packet 2f-20 with an SN of 39999, and a packet 2f-30 with an SN of 40001 and may store them without transferring them to an upper layer. The first timer 2f-50 may be a reordering timer or a separately defined timer. Duration of the first timer 2f-50 may be a value randomly determined by the terminal or may be a value preset by the base station.

After the first timer 2f-50 stops, the PDCP layer of the receiver may reorder the stored packets 2f-10, 2f-20, and 2f-30 and may transfer (2f-110, 2f-120, and 2f-130) them to the upper layer. Thereafter, variables of the PDCP layer of the receiver may be updated based on the packets 2f-10, 2f-20, and 2f-30. For example, the PDCP layer of the receiver may update Last_Submitted_PDCP_RX_SN to 40001 that is the latest PDCP SN transferred to the upper layer. In another example, Next_PDCP_RX_SN may be updated to 40002 that is predicted to arrive according to a sequential order. When a reordering timer is used as the first timer 2f-50, when a first arriving packet, i.e., the packet 2f-10 with the SN of 40000, arrives, the receiver may set Reordering_PDCP_RX_COUNT as a COUNT value by using the SN of 40001 and HFN. In addition, various methods of updating variables may be available.

Afterward, when a packet 2f-40 of which SN is 40002 arrives, the PDCP layer of the receiver may process the packet 2f-40 according to a PDCP operation of the receiver and then may transfer (2f-140) it to the upper layer.

In an embodiment of the disclosure, the PDCP layer of the receiver may start the first timer 2f-50 at a time when the packet 2f-10 with the SN of 40000 that is predicted to arrive first actually arrives, and may set Next_PDCP_RX_SN as 40001 that is obtained by adding 1 to the SN of the packet 2f-10 that arrives first. In addition, the PDCP layer of the receiver may set Reordering_PDCP_RX_COUNT for reordering as a COUNT value that is calculated by using Next_PDCP_RX_SN and a HFN value. In this regard, a value of Last_Submitted_PDCP_RX_SN may be set as a value preceding, by a certain number, 40000 that is the SN of the packet 2f-10 that arrives first. For example, the value of Last_Submitted_PDCP_RX_SN may be set as 30000 obtained by subtracting 10000 from 40000 that is the SN of the packet 2f-10 that arrives first. In this regard, at 2f-200, an operation of updating a variable after the first timer 2f-50 stops may be performed by a reordering operation of the PDCP layer of the receiver, and is matched with a result of FIG. 19.

Figure 20:
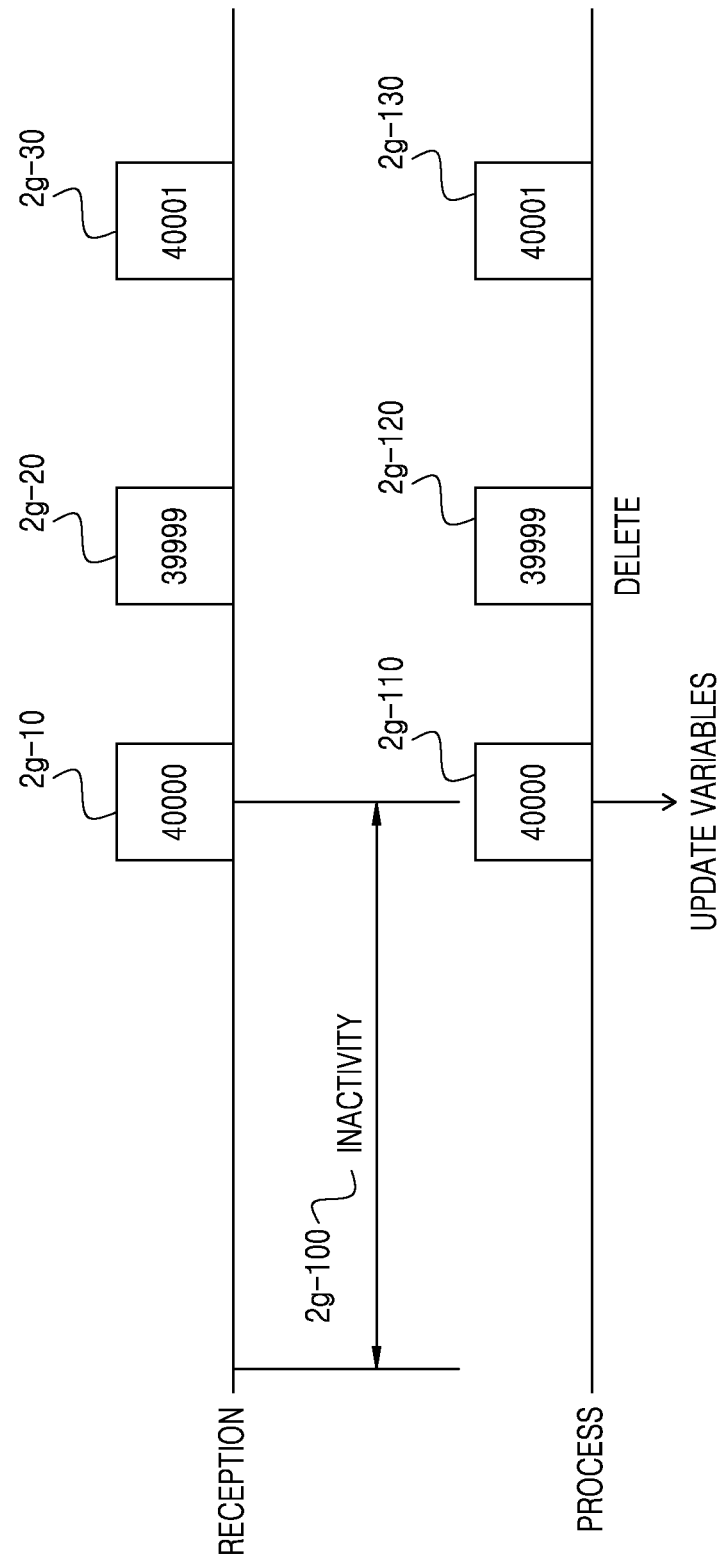
FIG. 20 is a diagram illustrating an operation performed by a PDCP layer of a receiver when the PDCP layer of the receiver starts reception according to an embodiment of the disclosure.

FIG. 20 is a diagram illustrating an operation performed by a PDCP layer of a receiver when the PDCP layer of the receiver starts reception according to an embodiment of the disclosure.

Referring to FIG. 20, when the PDCP layer of the receiver receives a packet 2g-10 with a SN of 40000, it is required for the receiver to identify whether the packet 2g-10 is normally received or is an outdated packet of which validity is expired in previous reception. To this end, when a packet exceeding a PDCP reception window arrives, the PDCP layer of the receiver may determine whether a state in which a corresponding radio bearer does not receive a packet has been maintained during a preset time 2g-100. The preset time 2g-100 may be randomly set by the terminal, may be a default set time of a system, or may be set by the base station.

In a case where the receiver receives a packet, when packet reception did not occur during a previous certain time, the PDCP layer of the receiver may first process the received packet after the certain time in which the packet reception did not occur, and may transfer the packet to an upper layer. For example, as illustrated in an embodiment of FIG. 20, the receiver may process the packet 2g-10 with the SN of 40000 and may transfer (2g-110) it to the upper layer. Then, variables of the PDCP layer of the receiver may be updated based on the packet 2g-10. For example, the PDCP layer of the receiver may update Last_Submitted_PDCP_RX_SN to 40000 that is the latest PDCP SN transferred to the upper layer. In another example, Next_PDCP_RX_SN may be updated to 40001 that is predicted to arrive according to a sequential order. In addition, various methods of updating variables may be available.

Afterward, when a packet 2g-20 of which SN is 39999 arrives, the packet 2g-20 has a value lower than Last_Submitted_PDCP_RX_SN, and thus, the PDCP layer of the receiver may delete (2g-120) the packet 2g-20. Afterward, when a packet 2g-30 of which SN is 40001 arrives, the PDCP layer of the receiver may process the packet 2g-30 according to a PDCP operation of the receiver and then may transfer (2g-130) it to the upper layer FIG. 21 is a diagram illustrating an operation of transmitting a packet, the operation being performed by a PDCP layer of a transmitter according to an embodiment of the disclosure.

When the transmitter and the receiver use a SN for duplicate packet transmission or encryption, the SN may not be able to exceed a maximum value of a designated SN.

Figure 21:
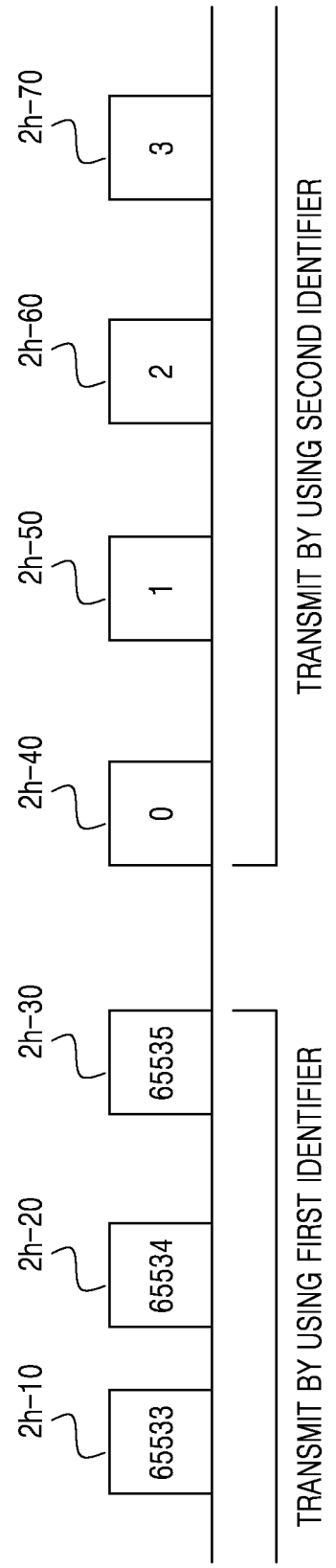
FIG. 21 is a diagram illustrating an operation of transmitting a packet, the operation being performed by a PDCP layer of a transmitter according to an embodiment of the disclosure.

Referring to FIG. 21, it is assumed that the SN has a 16-bit value, and thus a maximum value of the SN is 2^16−1=65535. Therefore, in an embodiment of FIG. 21, when a value of an SN exceeds 65535, it is required to initialize the SN. However, in a case where the transmitter does not have a wraparound function with respect to SNs, i.e., a function of re-starting SNs from the initialization, the transmitter may not be able to randomly initialize an SN.

An embodiment of FIG. 21 provides an example in which, when it is a maximum value of an SN, the SN is started by using a different identifier. In an embodiment of the disclosure, the transmitter may transmit (2h-10, 2h-20, and 2h-30) SNs, which are previously used, by using a first identifier, and may transmit (2h-40, 2h-50, 2h-60, and 2h-70) SNs, which are newly started, by using a second identifier. By changing an indicator with respect to a radio bearer, an SN may be restarted. In this regard, the first identifier or the second identifier may include identification (ID) of a LCH, ID of a radio bearer, ID of a second layer, or the like of the terminal. In an embodiment of FIG. 21, it is assumed that an SN starts from 0, but in another embodiment of the disclosure in which duplicate packet transmission is used or the like, the SN may start from 1.

Figure 22:
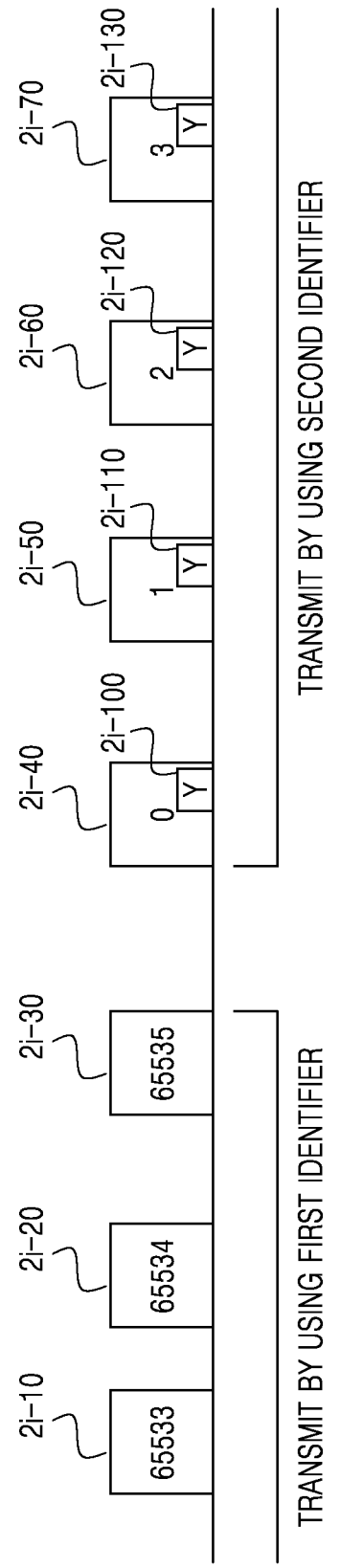
FIG. 22 is a diagram illustrating an operation of transmitting a packet, the operation being performed by a PDCP layer of a transmitter according to an embodiment of the disclosure.

FIG. 22 is a diagram illustrating an operation of transmitting a packet, the operation being performed by a PDCP layer of a transmitter according to an embodiment of the disclosure.

When the transmitter and the receiver use a SN for duplicate packet transmission or encryption, the SN may not be able to exceed a maximum value of a designated SN.

Referring to FIG. 22, it is assumed that the SN has a 16-bit value, and thus a maximum value of the SN is 2^16−1=65535. Therefore, when a value of an SN exceeds 65535, it is required to initialize the SN. However, in a case where the transmitter does not have a wraparound function with respect to SNs, i.e., a function of re-starting SNs from the initialization, the transmitter may not be able to randomly initialize an SN.

An embodiment of FIG. 22 provides an example in which, when it is a maximum value of an SN, the SN is started by using a different identifier. In an embodiment of the disclosure, the transmitter may transmit (2i-10, 2i-20, and 2i-30) SNs, which are previously used, by using a first identifier, and may transmit (2i-40, 2i-50, 2i-60, and 2i-70) SNs, which are newly started, by using a second identifier By changing an indicator with respect to a radio bearer, an SN may be restarted. In this regard, the first identifier or the second identifier may include ID of a LCH, ID of a radio bearer, ID of a second layer, or the like of the terminal.

However, when transmission is performed by using the second identifier, it is not guaranteed, with only a change in an identifier, that a corresponding radio bearer is the same as a radio bearer from which transmission using a previous identifier is performed. Therefore, in an embodiment of FIG. 22, a PDCP header may include fields 2i-100, 2i-110, 2i-120, and 2i-130 indicating that transmission of corresponding packets is transmission with a changed identifier. When such field is set, the PDCP layer of the receiver may recognize that a radio bearer from which a certain packet is transmitted is equal to a radio bearer of previous transmission, and an identifier is changed to a second identifier so as to initialize SNs. In an embodiment of FIG. 22, it is assumed that an SN starts from 0, but in another embodiment of the disclosure in which duplicate packet transmission is used or the like, the SN may start from 1.

Figure 23:
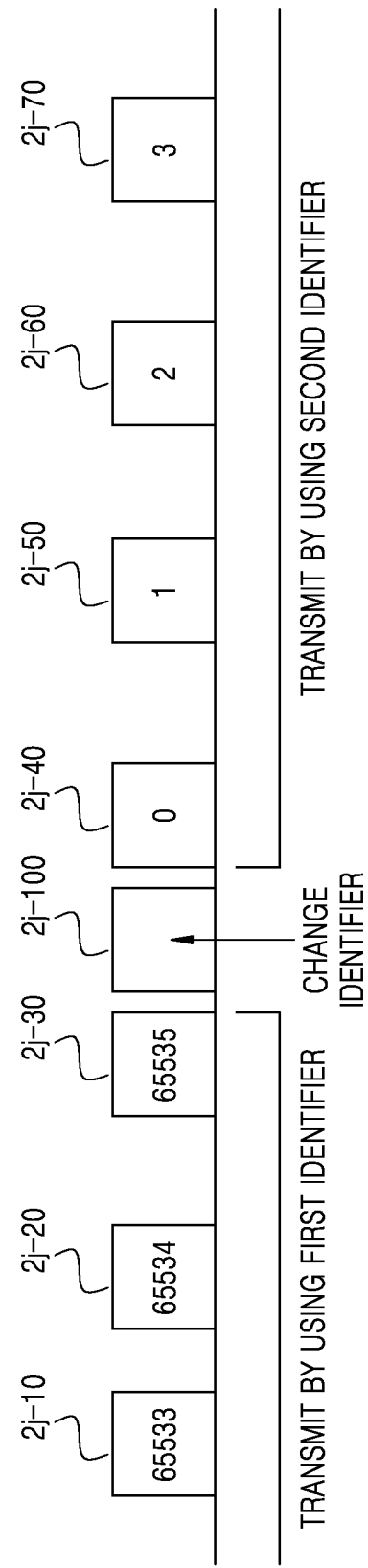
FIG. 23 is a diagram illustrating an operation of transmitting a packet, the operation being performed by a PDCP layer of a transmitter according to an embodiment of the disclosure.

FIG. 23 is a diagram illustrating an operation of transmitting a packet, the operation being performed by a PDCP layer of a transmitter according to an embodiment of the disclosure.

When the transmitter and the receiver use a SN for duplicate packet transmission or encryption, the SN may not be able to exceed a maximum value of a designated SN.

Referring to FIG. 23, it is assumed that the SN has a 16-bit value, and thus a maximum value of the SN is 2^16−1=65535. Therefore, when a value of an SN exceeds 65535, it is required to initialize the SN. However, in a case where the transmitter does not have a wraparound function with respect to SNs, i.e., a function of re-starting SNs from the initialization, the transmitter may not be able to randomly initialize an SN.

Referring to FIG. 23 provides an example in which, when it is a maximum value of an SN, the SN is started by using a different identifier. In an embodiment of the disclosure, the transmitter may transmit (2j-10, 2j-20, and 2j-30) SNs, which are previously used, by using a first identifier, and may transmit (2j-40, 2j-50, 2j-60, and 2j-70) SNs, which are newly started, by using a second identifier. By changing an indicator with respect to a radio bearer, an SN may be restarted. In this regard, the first identifier or the second identifier may include ID of a LCH, ID of a radio bearer, ID of a second layer, or the like of the terminal.

However, when transmission is performed by using the second identifier, it is not guaranteed, with only a change in an identifier, that a corresponding radio bearer is the same as a radio bearer from which transmission using a previous identifier is performed. Therefore, in an embodiment of FIG. 23, before transmission using the second identifier is performed, an identifier change message 2*j*-100 is transmitted to the receiver, such that the receiver may recognize that SNs are initialized by changing an identifier. When the receiver receives such message, the PDCP layer of the receiver may recognize that a radio bearer from which a certain packet is transmitted is equal to a radio bearer of previous transmission, and an identifier is changed to the second identifier so as to initialize SNs. In an embodiment of FIG. 23, it is assumed that an SN starts from 0, but in another embodiment of the disclosure in which duplicate packet transmission is used or the like, the SN may start from 1.

Figure 24:
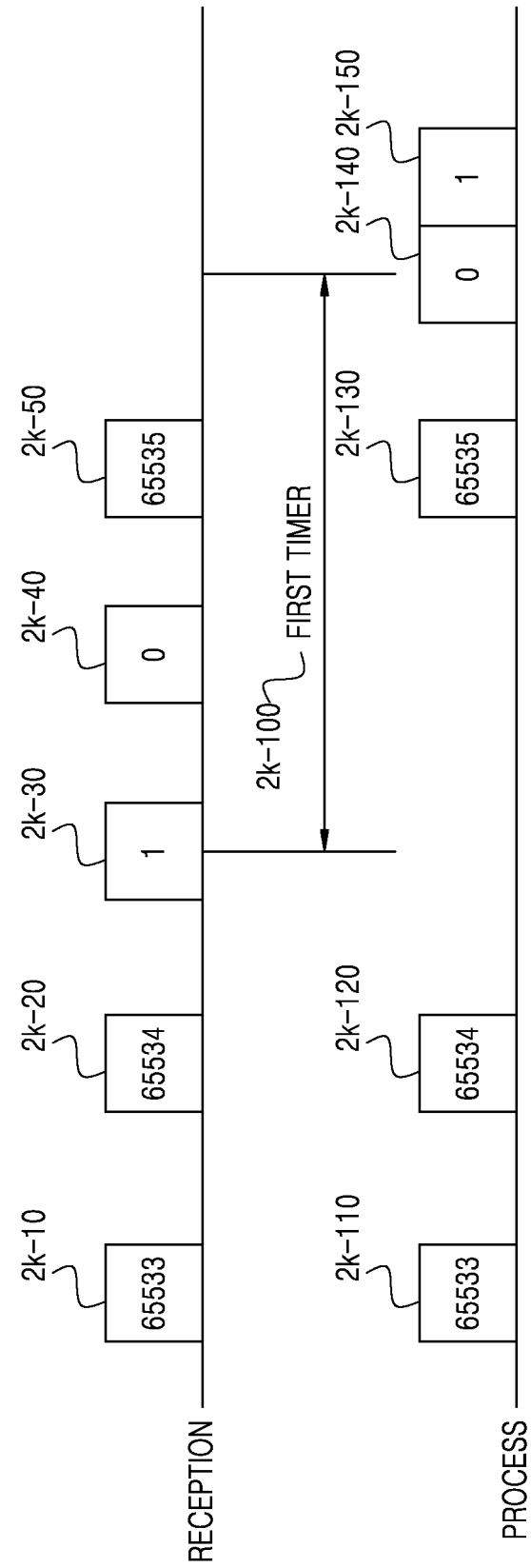
FIG. 24 is a diagram illustrating an operation of receiving a packet, the operation being performed by a PDCP layer of a receiver according to an embodiment of the disclosure.

FIG. 24 is a diagram illustrating an operation of receiving a packet, the operation being performed by a PDCP layer of a receiver according to an embodiment of the disclosure.

In an embodiment of the disclosure, when a SN of a radio bearer with respect to data transmitted from the transmitter is a maximum value, the transmitter may initialize the SN by using the method described with reference to FIGS. 21 to 23.

Referring to FIG. 24, it is assumed that a packet 2*k*-10 with an SN of 65533 and a packet 2*k*-20 with an SN of 65534 are transmitted by using a first identifier. Because the packets 2*k*-10 and 2*k*-20 are arrived in sequence at the receiver, the PDCP layer of the receiver may immediately process the packets 2*k*-10 and 2*k*-20 upon reception and may transfer (2*k*-110 and 2*k*-120) them to an upper layer. Afterward, a packet 2*k*-30 with an SN of 1 may arrive by using a second identifier. However, it is not guaranteed for the receiver that a packet using the first identifier will not arrive any more. Therefore, the PDCP layer of the receiver may not immediately process the packet 2*k*-30 with the SN of 1.

Referring to FIG. 24, in an embodiment of the disclosure, the PDCP layer of the receiver may start a first timer 2*k*-100 of certain duration at a time when the packet 2*k*-30 using the second identifier arrives. Until the first timer 2*k*-100 stops, the PDCP layer of the receiver may not process the packet 2*k*-30 using the second identifier but may store the packet 2*k*-30.

After the packet 2*k*-30 with the SN of 1 arrives, a packet 2*k*-40 with an SN of 0 may arrive. Because the packet 2*k*-40 has arrived before the first timer 2*k*-100 stops, the packet 2*k*-40 may not be processed but may be stored. Afterward, when a packet 2*k*-50/2*k*-130 with an SN of 65535 arrives, because the packet 2*k*-50 that uses the first identifier is a previous packet before SNs are initialized, the packet 2*k*-50 may be immediately processed as soon as the packet 2*k*-50 arrives. According to an embodiment of the disclosure, a packet may be completely reordered and then may be processed.

The PDCP layer of the receiver may process packets transmitted by using the second identifier, the packets having been stored after the first timer 2*k*-100 stops, and may transfer (2*k*-140 and 2*k*-150) them to the upper layer. The first timer 2*k*-100 may be a reordering timer or a separately defined timer. Duration of the first timer 2*k*-100 may be a value randomly determined by the terminal or may be a value preset by the base station.

Figure 25:
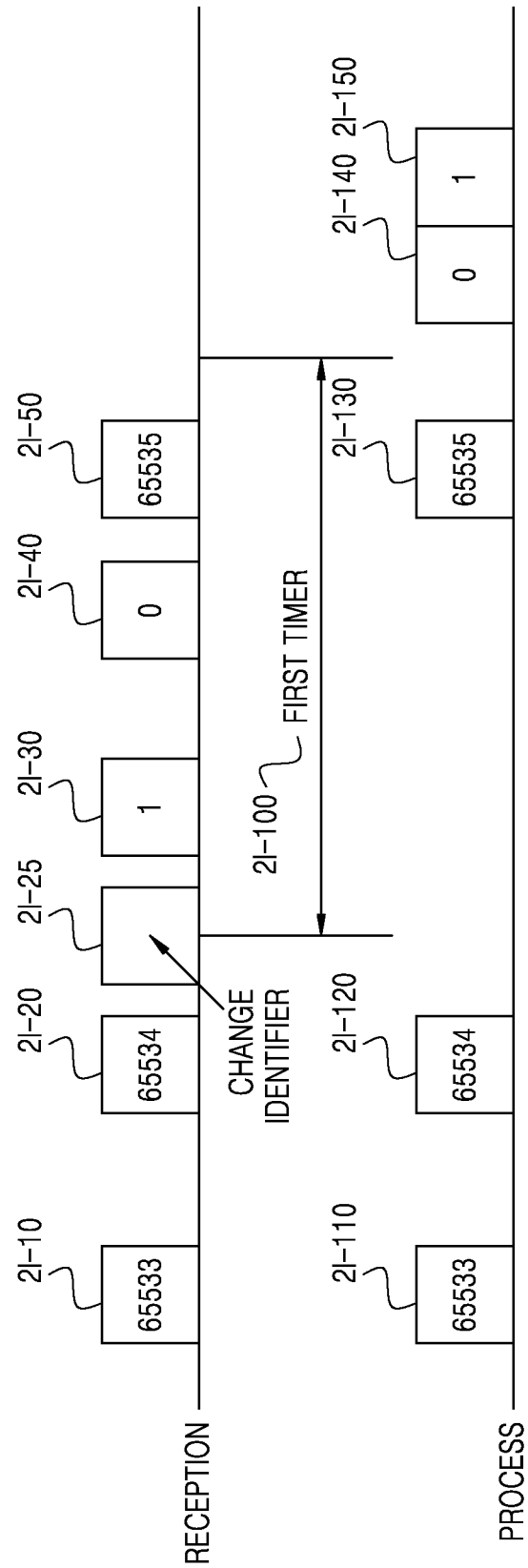
FIG. 25 is a diagram illustrating an operation of receiving a packet, the operation being performed by a PDCP layer of a receiver according to an embodiment of the disclosure.

FIG. 25 is a diagram illustrating an operation of receiving a packet, the operation being performed by a PDCP layer of a receiver according to an embodiment of the disclosure.

In an embodiment of the disclosure, when a SN of a radio bearer with respect to data transmitted from the transmitter is a maximum value, the transmitter may initialize the SN by using an identifier change message, according to the method described with reference to FIG. 23.

Referring to FIG. 25, it is assumed that a packet 2*l*-10 with an SN of 65533 and a packet 2*l*-20 with an SN of 65534 are transmitted by using a first identifier. Because the packets 2*l*-10 and 2*l*-20 are arrived in sequence at the receiver, the receiver may immediately process the packets 2*l*-10 and 2*l*-20 upon reception and may transfer (2*l*-110 and 2*l*-120) them to an upper layer. Afterward, an identifier change message 2*l*-25 may arrive at the PDCP layer of the receiver. When the identifier change message 2*l*-25 is received, the receiver may determine that packets to be arrived at a later time by using a second identifier are packets that carry the same data and for which SNs are initialized.

In an embodiment of the disclosure, the PDCP layer of the receiver may start a first timer 2*l*-100 of certain duration at a time when the identifier change message 2*l*-25 arrives. Until the first timer 2*l*-100 stops, the PDCP layer of the receiver may not process a packet using the second identifier but may store the packet.

Referring to FIG. 25, after a packet 2*l*-30 with an SN of 1 arrives, a packet 2*l*-40 with an SN of 0 may arrive. Because the packet 2*l*-40 has arrived before the first timer 2*l*-100 stops, the packet 2*l*-40 may not be processed but may be stored. Afterward, when a packet 2*l*-50/2*l*-130 with an SN of 65535 arrives, because the packet 2*l*-50 that uses the first identifier is a previous packet before SNs are initialized, the packet 2*l*-50 may be immediately processed as soon as the packet 2*l*-50 arrives. According to an embodiment of the disclosure, a packet may be completely reordered and then may be processed.

The PDCP layer of the receiver may process packets transmitted by using the second identifier, the packets having been stored after the first timer 2*l*-100 stops, and may transfer (2*l*-140 and 2*l*-150) them to the upper layer. The first timer 2*l*-100 may be a reordering timer or a separately defined timer. Duration of the first timer 2*l*-100 may be a value randomly determined by the terminal or may be a value preset by the base station.

Figure 26:
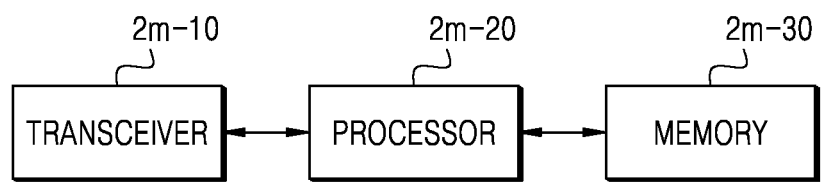
FIG. 26 illustrates a block diagram of a terminal according to an embodiment of the disclosure.

FIG. 26 illustrates a block diagram of a terminal according to an embodiment of the disclosure.

Referring to FIG. 26, the terminal may include a transceiver 2*m*-10, a processor 2*m*-20, and a memory 2*m*-30. According to a communication method of the terminal described above, the transceiver 2*m*-10, the processor 2*m*-20, and the memory 2*m*-30 of the terminal may operate. However, elements of the terminal are not limited to the aforementioned example. For example, the terminal may be embodied with more elements than the aforementioned elements or may be embodied with fewer elements than the elements. In addition, the transceiver 2*m*-10, the processor 2*m*-20, and the memory 2*m*-30 may be implemented as one chip.

The processor 2*m*-20 may control a series of processes to make the terminal operate according to the embodiments of the disclosure. For example, the processor 2*m*-20 may control a signal flow between blocks to perform operations according to the embodiments of the disclosure.

The transceiver 2*m*-10 may transceive a signal to/from another network entity. For example, the transceiver 2*m*-10 may receive, from the base station, system information, and at least one of a synchronization signal or a reference signal. To this end, the transceiver 2*m*-10 may include a radio frequency (RF) transmitter configured to up-convert and amplify a frequency of a signal to be transmitted, and a RF receiver configured to low-noise amplify a received signal and down-convert a frequency. However, the aforementioned example is merely an embodiment of the transceiver 2*m*-10, and the elements of the transceiver 2*m*-10 are not limited to the RF transmitter and the RF receiver.

The memory 2*m*-30 may store at least one of information transceived through the transceiver 2*m*-10 or information generated by the processor 2*m*-20. The memory 2*m*-30 may store programs and data required in operations of the terminal. In addition, the memory 2*m*-30 may store control information or data included in a signal obtained by the terminal. The memory 2*m*-30 may be configured as a storage medium or a combination of storage media including ROM, RAM, a hard disk, CD-ROM, DVD, or the like. In addition, the memory 2*m*-30 may include a plurality of memories. In an embodiment of the disclosure, the memory 2*m*-30 may store a program for supporting beam-based coordinated communication.

Figure 27:
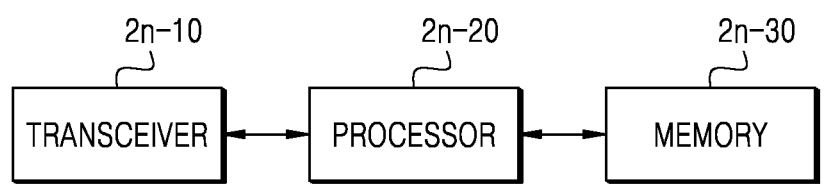
FIG. 27 illustrates a block diagram of a base station according to an embodiment of the disclosure.

FIG. 27 illustrates a block diagram of a base station according to an embodiment of the disclosure.

Referring to FIG. 27, the base station may include a transceiver 2*n*-10, a processor 2*n*-20, and a memory 2*n*-30. In an embodiment of the disclosure, the processor 2*n*-20 may be defined as an integrated circuit or at least one processor dedicated to a circuit or an application. However, elements of the base station are not limited to the aforementioned example. For example, the base station may be embodied with more elements than the aforementioned elements or may be embodied with fewer elements than the elements. In addition, the transceiver 2*n*-10, the processor 2*n*-20, and the memory 2*n*-30 may be implemented as one chip.

The transceiver 2*n*-10 may transceive a signal to/from another network entity. For example, the transceiver 2*n*-10 may transmit, to a terminal, system information, and at least one of a synchronization signal or a reference signal.

The processor 2*n*-20 may control general operations of the base station according to embodiments of the disclosure. For example, the processor 2*n*-20 may control a signal flow between blocks to perform operations described with reference to drawings.

The memory 2*n*-30 may store at least one of information transceived through the transceiver 2*n*-10 or information generated by the processor 2*n*-20. In addition, the memory 2*n*-30 may store control information or data included in a signal obtained by the base station. The memory 2*n*-30 may be configured as a storage medium or a combination of storage media including a ROM, a RAM, a hard disk, a CD-ROM, a DVD, or the like. In addition, the memory 2*n*-30 may include a plurality of memories. In an embodiment of the disclosure, the memory 2*n*-30 may store a program for supporting beam-based coordinated communication.

The methods according to the embodiments of the disclosure described in the claims or the detailed description may be implemented in hardware, software, or a combination of hardware and software.

When the methods are implemented in software, a computer-readable recording medium having one or more programs (software modules) recorded thereon may be provided. The one or more programs recorded on the computer-readable recording medium or a computer program product are configured to be executable by one or more processors in a device. The one or more programs include instructions to execute the methods according to the embodiments of the disclosure described in the claims or the detailed description.

The programs (e.g., software modules or software) may be stored in a RAM, a non-volatile memory including a flash memory, a ROM, an electrically erasable programmable read-only memory (EEPROM), a magnetic disc storage device, a CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network, such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. In addition, the embodiments of the disclosure may be combined with each other as required. In addition, the embodiments of the disclosure may be applied to other communication systems, such as a long term evolution (LTE) system, $5^{th}$ generation (5G), a new radio (NR) system, or the like.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method, performed by a terminal in a wireless communication system, the method comprising:
   receiving, from a transmission entity, packet data convergence protocol (PDCP) data, wherein the PDCP data is first received after the terminal enters a reception-enabled zone;
   identifying whether no PDCP data related to a radio bearer is received during a time period up to a time when the PDCP data is received, wherein the radio bearer is associated with the transmission entity;
   in case that no PDCP data related to the radio bearer is received during the time period, starting a PDCP reordering timer; and
   in case that a value of a sequence number (SN) of the received PDCP data is not set to 0,
      setting a value of a Next_PDCP_RX_SN variable, which indicates a predicted SN of PDCP data to be received, to a value associated with adding a first setting value to the value of the SN of the received PDCP data, wherein the first setting value is 1, and setting a value of a Last_Submitted_PDCP_RX_SN variable, which indicates an SN of last PDCP data transferred to an upper layer, to a value associated with subtracting a second setting value from the value of the SN of the received PDCP data, wherein the second setting value is greater than 1.

2. The method of claim 1, further comprising:
receiving, from the transmission entity, PDCP data with an SN having a value less than the value of the SN of the PDCP data that is first received, while the PDCP reordering timer is running;
in case that the PDCP reordering timer stops, reordering the PDCP data that is first received and the PDCP data that is received while the PDCP reordering timer is running; and
transmitting, to the upper layer, the PDCP data that is first received and the PDCP data that is received while the PDCP reordering timer is running.

3. The method of claim 1, further comprising:
setting a value of a Reordering_PDCP_RX_COUNT variable by using the value of the Next_PDCP_RX_SN variable, the Reordering_PDCP_RX_COUNT variable being used by the PDCP reordering timer.

4. The method of claim 1, wherein the PDCP data is transmitted from the transmission entity by using a vehicle-to-everything (V2X) communication scheme.

5. A terminal in a wireless communication system, the terminal comprising:
a transceiver; and
at least one processor configured to:
receive, from a transmission entity via the transceiver, packet data convergence protocol (PDCP) data, wherein the PDCP data is first received after the terminal enters a reception-enabled zone,
identify whether no PDCP data related to a radio bearer is received during a time period up to a time when the PDCP data is received, wherein the radio bearer is associated with the transmission entity,
in case that no PDCP data related to the radio bearer is received during the time period, start a PDCP reordering timer, and
in case that a value of a sequence number (SN) of the received PDCP data is not set to 0,
set a value of a Next_PDCP_RX_SN variable, which indicates a predicted SN of PDCP data to be received, to a value associated with adding a first setting value to the value of the SN of the received PDCP data, wherein the first setting value is 1 and
set a value of a Last_Submitted_PDCP_RX_SN variable, which indicates an SN of last PDCP data transferred to an upper layer, to a value associated with subtracting a second setting value from the value of the SN of the received PDCP data, wherein the second setting value is greater than 1.

6. The terminal of claim 5, wherein the at least one processor is further configured to:
receive, from the transmission entity via the transceiver, PDCP data with an SN having a value less than the value of the SN of the PDCP data that is received first, while the PDCP reordering timer is running;
in case that the PDCP reordering timer stops, reorder the PDCP data that is received first and the PDCP data that is received while the PDCP reordering timer is running; and
transmit, to the upper layer via the transceiver, the PDCP data that is first received and the PDCP data that is received while the PDCP reordering timer is running.

7. The terminal of claim 5, wherein the at least one processor is further configured to set a value of a Reordering_PDCP_RX_COUNT variable by using the value of the Next_PDCP_RX_SN variable, the Reordering_PDCP_RX_COUNT variable being used by the PDCP reordering timer.

8. The terminal of claim 5, wherein the PDCP data is transmitted from the transmission entity by using a vehicle-to-everything (V2X) communication scheme.

* * * * *